(12) United States Patent
Rykaczewski

(10) Patent No.: US 10,501,640 B2
(45) Date of Patent: Dec. 10, 2019

(54) NANOPOROUS MATERIALS, METHOD OF MANUFACTURE AND METHODS OF USE

(71) Applicant: ARIZONA BOARD OF REGENTS ON BEHALF OF ARIZONA STATE UNIVERSITY, Scottsdale, AZ (US)

(72) Inventor: Konrad Rykaczewski, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 15/878,158

(22) Filed: Jan. 23, 2018

(65) Prior Publication Data

US 2018/0215927 A1 Aug. 2, 2018

Related U.S. Application Data

(60) Provisional application No. 62/452,785, filed on Jan. 31, 2017.

(51) Int. Cl.
*C09D 5/00* (2006.01)
*B05D 1/18* (2006.01)
(Continued)

(52) U.S. Cl.
CPC .............. *C09D 5/00* (2013.01); *B05D 1/18* (2013.01); *C08J 9/0023* (2013.01); *C08J 9/0061* (2013.01);
(Continued)

(58) Field of Classification Search
None
See application file for complete search history.

(56) References Cited

U.S. PATENT DOCUMENTS 2,075,658 A * 3/1937 Ramsbottom .......... B64D 15/16
244/134 C
5,238,592 A 8/1993 Stankowiak
(Continued)

FOREIGN PATENT DOCUMENTS

JP 2001032204 A 2/2001
KR 1020130023327 A 3/2013
(Continued)

OTHER PUBLICATIONS

Xiaoda Sun et al.; Inhibition of Condensation Frosting by Arrays of Hygroscopic Antifreeze Drops; 2015; pp. 13743-13752; ACS Publications, American Chemical Society; US.
(Continued)

*Primary Examiner* — Chinessa T. Golden
(74) *Attorney, Agent, or Firm* — Fish & Richardson P.C.

(57) ABSTRACT

Embodiments of the invention include a coating or film assembly and a method of making the assembly which has a first layer at least partially infused with at least one antifreeze material, and a second layer at least partially coupled to at least a portion of the first layer. In some embodiments, at least a portion of the second layer includes pores with a defined spacing. In some embodiments, at least a portion of the second layer is rendered hydrophilic in the presence of absorbed moisture or phases of ice including frost, rime, and/or glaze. Further, in some embodiments, at least a portion of the first layer enables the antifreeze material to migrate through and out of the first layer into at least a portion of a hydrophilic region of the second layer.

20 Claims, 19 Drawing Sheets

(51) Int. Cl.
  *C09D 7/63* (2018.01)
  *C08J 9/00* (2006.01)
  *C09D 177/00* (2006.01)
  *C08K 5/053* (2006.01)
  *C08K 5/05* (2006.01)
  *C08K 5/092* (2006.01)

(52) U.S. Cl.
  CPC ............. *C09D 7/63* (2018.01); *C08J 2377/00* (2013.01); *C08K 5/05* (2013.01); *C08K 5/053* (2013.01); *C08K 5/092* (2013.01); *C09D 177/00* (2013.01)

(56) References Cited

U.S. PATENT DOCUMENTS

| | | | |
|---|---|---|---|
| 7,285,331 | B1 | 10/2007 | Reihs |
| 7,563,505 | B2 | 7/2009 | Reihs |
| 8,252,259 | B2 | 8/2012 | Seal |
| 8,273,160 | B2 | 9/2012 | Wright |
| 8,574,704 | B2 | 11/2013 | Smith |
| 9,283,510 | B2 | 3/2016 | Lackner |
| 10,073,021 | B2 | 9/2018 | Rykaczewski |
| 2003/0096083 | A1 | 5/2003 | Morgan |
| 2006/0013735 | A1 | 1/2006 | Engelking |
| 2007/0070754 | A1 | 3/2007 | Vogelsang |
| 2007/0166513 | A1 | 7/2007 | Sheng |
| 2007/0279571 | A1 | 12/2007 | Koo |
| 2008/0118772 | A1 | 5/2008 | Dope |
| 2010/0086767 | A1* | 4/2010 | Thottupurathu .... B29C 47/0004 428/316.6 |
| 2010/0314575 | A1 | 12/2010 | Gao |
| 2011/0203174 | A1 | 8/2011 | Lackner |
| 2012/0325666 | A1 | 12/2012 | Ran |
| 2013/0251942 | A1 | 9/2013 | Azimi |
| 2014/0127516 | A1* | 5/2014 | Wang ..................... C08G 18/06 428/422 |
| 2015/0251767 | A1 | 9/2015 | Sapper |
| 2015/0299503 | A1* | 10/2015 | Carter ................... B64D 15/08 156/182 |
| 2016/0032074 | A1 | 2/2016 | Aizenberg |
| 2016/0075883 | A1 | 3/2016 | Ebert |
| 2017/0058141 | A1 | 3/2017 | Rykaczewski et al. |
| 2017/0145599 | A1 | 5/2017 | Mu |
| 2017/0183101 | A1 | 6/2017 | Rykaczewski |
| 2017/0321373 | A1 | 11/2017 | Rykaczewski et al. |
| 2019/0181069 | A1 | 6/2019 | Rykaczewski et al. |

FOREIGN PATENT DOCUMENTS

| | | |
|---|---|---|
| WO | WO0122803 A1 | 4/2001 |
| WO | WO2009060446 A2 | 5/2009 |
| WO | WO2015130597 | 3/2015 |
| WO | WO2015143389 A1 | 9/2015 |

OTHER PUBLICATIONS

Dietz, C. et al., "Visualization of droplet departure on a superhydrophobic surface and implications to heat transfer enhancement during dropwise condensation", Applied Physics Letters, 97, (3), 033104 (2010).
Chen, R. et al., "Nanowires for Enhanced Boiling Heat Transfer", Nano Letters, 9, (2), 548-553 (2009).
Varanasi, K. K. et al., "Frost formation and ice adhesion on superhydrophobic surfaces", Applied Physics Letters, 97, (23), 234102, (2010).
Meuler, A. J.; Smith, J. D.; Varanasi, K. K.; Mabry, J. M.; McKinley, G. H.; Cohen, R. E., Relationships between Water Wettability and Ice Adhesion. ACS Applied Materials & Interfaces 2010, 2, (11), 3100-3110.
Quere, D., "Non-sticking drops", Reports on Progress in Physics, 68, (11), 2495-2532. (2005).
Lafuma, A. et al., "Slippery pre-suffused surfaces", EPL (Europhysics Letters), 96, (5), 56001 (2011).
Wong, T.-S. et al., "Bioinspired self-repairing slippery surfaces with pressure-stable omniphobicity", Nature, 477, (7365), 443—447 (2011).
Kim, P. et al., "Liquid-Infused Nanostructured Surfaces with Extreme Anti-Ice and Anti-Frost Performance", ACS Nano, S. (8), 6569-6577 (2012).
Chang, Y. S., "Performance Analysis of Frostless Heat Exchanger by Spreading Aniffreeze Solution on Heat Exchanger Surface", Journal of Thermal Science and Technology, 6, (1), 123-131 (2011).
Varanasi, K. K. et al., "Spatial control in the heterogeneous nucleation of water", Applied Physics Letters, 95, (9), 094101 (2009).
Betz, A. R. et al., "Boiling heat transfer on superhydrophilic, superhydrophobic, and superbiphilic surfaces", International Journal of Heat and Mass Transfer, 57, (2), 733-741 (2013).
Betz, A. R. et al., "Do surfaces with mixed hydrophilic and hydrophobic areas enhance pool boiling?", Applied Physics Letters, 97, (14), 141909 (2010).
Ryerson, C. C., "Assessment of superstructure ice protection as applied to offshore oil operations safety: ice protection technologies, safety enhancements, and development needs", In Engineer Research and Development Center Hanover NH Cold Regions Research and Engineering Lab: 2009.
Ryerson, C. C., "Assessment of Superstructure Ice Protection as Applied to Offshore Oil Operations Safety: Problems, Hazards, Needs, and Potential Transfer Technologies", DTIC Document: 2008.
Parent, O. et al., "Anti-icing and de-icing techniques for wind turbines: Critical review", Cold Regions Science and Technology, 65, (1), 88-96 (2011).
Ryerson, C. C., "Ice protection of offshore platforms",- Cold Regions Science and Technology, 65, (1), 97-110 (2011 ).
Chang, Y. S. et al., "An Experimental Study on the Frost Prevention using Micro Liquid Film of an Antifreeze Solution", International Journal of Air-Conditioning and Refrigeration, 14, (2), 66-75 (2006).
Rykaczewski, K. et al., "Mechanism of Frost Formation on Lubricant Impregnated Surfaces", Langmuir, 29, (17), 0230-5238 (2013).
Bruening, M. et al., "Simultaneous Control of Surface Potential and Wetting of Solids with Chemisorbed Multifunctional Ligands", J. Am. Chem. Soc., 119, 5720-5728 (1997).
Faustini, M. et al, "Hydrophobic, Antireflective, Self-Cleaning, and Antifogging Sol-Gel Coatings: An Example of Multifunctional Nanostructured Materials for Photovoltaic Cells", Chem Mater, 22, 4406-4413 (2010).
Ferrari, M. "Switching surface wettability properties", Journal of Adhesion Science and Technology, vol. 28, Nos. 8—9, 1791-814(2014).
McCarthy, M. et al., "Materials, Fabrication, and Manufacturing of Micro/Nanostructured Surfaces for Phase-Change Heat Transfer Enhancement", Nanoscale and Microscale Thermophysical Engineering, 18: 288-310 (2014).
Tsougeni, Ket al., ""Smart" polymeric microfluidics fabricated by plasma processing: controlled welling, capillary filling and hydrophobic valving", Lab on aChip, 10, 462-469 (2010).
Ueda, E et al., "Emerging Applications of Superhydrophilic-Superhydrophobic Micropatterns", Adv. Mater., 25, 1234—1247 (2013).
Wang, Y. et al., "Design and Development of Anti-Icing Aluminum Surface", Materials Sciences and Applications, 4, B47-356 (2013).
Wang, Tao, Klaus S. Lackner, and Allen Wright. "Moisture swing sorbent for carbon dioxide capture from ambient air." Environmental science & technology 45, No. 15 (2011): 6670-6675.
Lackner, Klaus S., Sarah Brennan, Jürg M. Matter, A-H. Alissa Park, Allen Wright, and Bob Van Der Zwaan. "The urgency of the development of CO2 capture from ambient air." Proceedings of the National Academy of Sciences 109, No. 33 (2012): 13156-13162.
Wang, Tao Klaus S. Lackner, and Allen B. Wright. "Moisture-swing sorption for carbon dioxide capture from ambient air: a thermodynamic analysis." Physical Chemistry Chemical Physics 15, No. 2 (2013): 504-514.
Matthew J. Cliffe et al., "Correlated defect nanoregions in a metal-organic framework," Nature Communications 5, Article No. 4176 (2014).

(56) References Cited

OTHER PUBLICATIONS

Muzychka, Y. S.; Culham, J. R.; Yovanovich, M. M. Thermal Spreading Resistance of Eccentric Heat Sources on Rectangular Flux Channels. J. Electron. Packag. 2003, 125, 178-185.
Sun, X. et al., "Suppression of Frost Nucleation Achieved Using the Nanoengineered Integral Humidity Sink Effect," ACS Nano 2017, 11, 906-917.
Wickersham, Lab 19—Active Transport of Na by the Isolated Frog Skin, retrieved from http://www.wickersham.us/anne/frog.htm, Aug. 2, 2013, 3 pages.
Wagner, W. et al., "International Equations for the Pressure Along the Melting and Along the Sublimation Curve of Ordinary Water Substance", Journal of Physical and Chemical Reference Data, 1994 (available online Oct. 2009), vol. 23, pp. 515-527 <DOI:10.1063/1.555947>.
Wang, H. et al., "Fabrication and anti-frosting performance of super hydrophobic coating based on modified nano-sized calcium carbonate and ordinary polyacrylate", Applied Surface Science, Sep. 2007, vol. 253, No. 22, pp. 3818-8824 <DOI:10.1016/j.apsusc.2007.04.006>.
Wang, Z-J. et al., "Frost formation and anti-icing performance of a hydrophobic coating on aluminum", Experimental Thermal and Fluid Science, Jan. 2015, vol. 60, pp. 132-137 <DOI:10.1016/j.expthermflusci.2014.09.003>.
Williams, R. et al., "Inhibition of water condensation by a soluble salt nucleus", Journal of Chemical Physics, 1981 (available online Aug. 1988), vol. 74, pp. 4675-4677 <DOI:10.1063/1.441658>.
Wilson, P. et al., "Inhibition of ice nucleation by slippery liquid-infused porous surfaces (SLIPS)", Physical Chemistry Chemical Physics, Nov. 2012, vol. 15, No. 2, pp. 581-585 <DOI:10.1039/C2CP43586A>.
Wu, X. et al., "Investigation of the possibility of frost release from a cold surface", Experimental Thermal and Fluid Science, May 2001, vol. 24, No. 3-4, pp. 151-156 <DOI:10.1016/S0894-1777(01)00045-0>.
Xu, Q. et al., "Energy-Effective Frost-Free Coatings Based on Superhydrophobic Aligned Nanocones", ACS Applied Materials and Interfaces, Jun. 2014, vol. 6, No. 12, pp. 8976-8980 <DOI:10.1021/am502607e>.
Yang, Y. et al., "Development of Membrane-Based Desiccant Fiber for Vacuum Desiccant Cooling", Acs Applied Materials and Interfaces, Jun. 2016, vol. 8, No. 24, pp. 15778-15787 <DOI:10.1021/acsami.6b03006>.
Yang, Y. et al., "Man-portable personal cooling garment based on vacuum desiccant cooling", Applied Thermal Engineering, Dec. 2012, vol. 47, pp. 18-24 <DOI:10.1016/j.applthermaleng.2012.04.012>.
Yao, X. et al., "Adaptive fluid-infused porous films with tunable transparency and wettability", Nature Materials, Apr. 2013, vol. 12, pp. 529-534 <DOI:10.1038/NMAT3598>.
Yazdi, M. et al., "Personal Cooling Garments: A Review", The Journal of the Textile Institute, 2014, vol. 105, No. 12, pp. 1231-1250 <DOI:10.1080/00405000.2014.895088>.
Yovanovich, M. et al., "Thermal Spreading and Contact Resistances", Heat Transfer Handbook, 2003, Ch. 4, 132 pages.
Zhu, L. et al., "Ice-phobic Coatings Based on Silicon-Oil-Infused Polydimethylsiloxane", ACS Applied Materials & Interfaces, Apr. 2013, vol. 5, No. 10, pp. 4053-4062 <DOI 10.1021/am400704z>.
Aizenberg, J. et al., "Oriented Growth of Calcite Controlled by Self-Assembled Monolayers of Functionalized Alkanethiols Supported on Gold and Silver", Journal of the American Chemical Society, Apr. 1999, vol. 121, No. 18, pp. 4500-4509 <DOI:10.1021/ja984254k>.
Alizadeh, A. et al., "Dynamics of Ice Nucleation on Water Repellent Surfaces", Langmuir, Jan. 2012, vol. 28, No. 6, pp. 3180-3186 <DOI:10.1021/la2045256>.
American Physical Society's Division of Fluid Dynamics. "Tropical inspiration for an icy problem." ScienceDaily, ScienceDaily, Nov. 24, 2014, <www.sciencedaily.com/releases/2014/11/141124074737.htm>, 4 pages.

Ayres, J. et al., "Characterization of titanium alkoxide sol—gel systems designed for anti-icing coatings: I. Chemistry", Journal of Coatings Technology and Research, Dec. 2007 (available online Nov. 2007), vol. 4, No. 4, pp. 463-471 <DOI:10.1007/s11998-007-9054-8>.
Ayres, J. et al., "Characterization of titanium alkoxide sol—gel systems designed for anti-icing coatings: II Mass loss kinetics", Journal of Coatings Technology and Research, Dec. 2007 (available online Nov. 2007), vol. 4, No. 4, pp. 473-481 <DOI:10.1007/s11998-007-9055-7>.
Subramanyam, K. Rykaczewski, K. K. Varanasi, Langmuir 2013, 29, 5230.
Beysens, D. et al., "Growth of Breath Figures", Physical Review Letters, Sep. 1986, vol. 57, pp. 1433-1436 <DOI:10.1103/PhysRevLett.57.1433>.
Boluk, Y., "Adhesion of Freezing Precipitates to Aircraft Surfaces", Transports Canada, 1996.
Boreyko, J. et al., "Controlling condensation and frost growth with chemical micropatterns", Scientific Reports, Jan. 2016, vol. 6, article 19131, 15 pages <DOI:10.1038/srep19131>.
Boreyko, J. et al., "Delayed Frost Growth on Jumping-Drop Superhydrophobic Surfaces", ACS Nano, Jan. 2013, vol. 7, No. 2, pp. 1618-1627 <DOI:10.1021/nn3055048>.
Boreyko, J. et al., "Dynamic Defrosting on Nanostructured Superhydrophobic Surfaces", Langmuir, Jul. 2013, vol. 29, No. 30, pp. 9516-9524 <DOI:10.1021/la401282c>.
Boreyko, J. et al., "Self-Propelled Dropwise Condensate on Superhydrophobic Surfaces", Physical Review Letters, Oct. 2009, vol. 103, article 184501, 4 pages <DOI:10.1103/PhysRevLett.103.184501>.
Cadarette, B. et al., "Intermittent microclimate cooling during exercise-heat stress in U.S. army chemical protective clothing", Ergonomics, Feb. 2006, vol. 49, No. 2, pp. 209-219 <DOI:10.1080/00140130500436106>.
Cai, L. et al., "Study on restraining frost growth at initial stage by hydrophobic coating and hygroscopic coating", Energy and Buildings, May 2011, vol. 43, No. 5, pp. 1159-1163 <DOI:10.1016/j.enbuild.2010.09.012>.
Cao, L. et al., "Anti-Icing Superhydrophobic Coatings", Langmuir, Oct. 2009, vol. 25, No. 21, pp. 12444-12448 DOI:10.1021/la902882b>.
Carey, V., "Liquid-vapor phase-change phenomena : an introduction to the thermophysics of vaporization and condensation processes in heat transfer equipment", Taylor & Francis (New York), 2nd Edition, 2008.
Chambers, A. et al., "A liquid cooled garment temperature controller based on sweat rate", NTRS, 1972, article N72-27125, pp. 283-287.
Chen, J. et al., "Anti-Ice Coating Inspired by Ice Skating", Small, Nov. 2014 (available online Aug. 2014), vol. 10, No. 22, pp. 4693-4699 <DOI:10.1002/smll.201401557>.
Chen, J. et al., "Robust Prototypical Anti-icing Coatings with a Self-lubricating Liquid Water Layer between Ice and Substrate", ACS Applied Materials & Interfaces, May 2013, vol. 5, No. 10, pp. 4026-4030 <DOI:10.1021/am401004t>.
Chen, X. et al., "Activating the Microscale Edge Effect in a Hierarchical Surface for Frosting Suppression and Defrosting Promotion", Scientific Reports, Aug. 2013, vol. 3, article 2515, 8 pages <DOI:10.1038/srep02515>.
Chen, X. et al., "Nanograssed Micropyramidal Architectures for Continuous Dropwise Condensation", Advanced Functional Materials, Sep. 2011, vol. 21, pp. 4617-4623 <DOI:10.1002/adfm.201101302>.
Dou, R. et al., "Anti-icing Coating with an Aqueous Lubricating Layer", ACS Applied Materials & Interfaces, May 2014, vol. 6, No. 10, pp. 6998-7003 <DOI:10.1021/am501252u>.
DOW Chemical Company., "A Guide to Glycols", DOW, 2003, 58 slides.
Eberle, P. et al., "Rational nanostructuring of surfaces for extraordinary icephobicity", Nanoscale, Feb. 2014, vol. 6, No. 9, pp. 4874-4881 <DOI:10.1039/C3NR06644D>.

(56) References Cited

OTHER PUBLICATIONS

El Cheikh, A. et al., "A mathematical model for frost growth and densification on flat surfaces", International Journal of Heat and Mass Transfer, Oct. 2014, vol. 77, pp. 604-611 <DOI:10.1016/j.ijheatmasstransfer.2014.05.054>.
Emery, A. et al., "Experimental Measurements of the Effects of Frost Formation on Heat Exchanger Performance", American Society of Mechanical Engineers, Heat Transfer Division: Seattle, WA, 1990, pp. 1-7.
Enright, R. et al., "Condensation on Superhydrophobic Surfaces: The Role of Local Energy Barriers and Structure Length Scale", Langmuir, Aug. 2012, vol. 28, No. 40, pp. 14424-14432 <DOI:10.1021/la302599n>.
Farhadi, S. et al., "Anti-icing performance of superhydrophobic surfaces", Applied Surface Science, May 2011 (available online Feb. 2011), vol. 257, No. 14, pp. 6264-6269 <DOI:10.1016/j.apsusc.2011.02.057>.
Fletcher, N. et al., "The Physics of Rainclouds", Cambridge University Press (New York), 1966.
Fletcher, N., "Size Effect in Heterogeneous Nucleation", The Journal of Chemical Physics, Sep. 1958, vol. 29, No. 3, pp. 572-576 <DOI:10.1063/1.1744540>.
Flouris, A. et al., "Design and Control Optimization of Microclimate Liquid Cooling Systems Underneath Protective Clothing", Annals of Biomedical Engineering, Mar. 2006, vol. 34, No. 3, pp. 359-372 <DOI:10.1007/s10439-005-9061-9>.
Ford, T. et al., "NRL Report 5832", Naval Research Laboratory (Arlington, VA), 1962.
Garrod, R. et al., "Mimicking a Stenocara Beetle's Back for Microcondensation Using Plasmachemical Patterned Superhydrophobic-Superhydrophilic Surfaces", Langmuir, 2007 (available online Dec. 2006), vol. 23, No. 2, pp. 689-693 <DOI:10.1021/la0610856>.
Ghosh, A. et al., "Enhancing Dropwise Condensation through Bioinspired Wettability Patterning", Langmuir, Oct. 2014, vol. 30, No. 43, pp. 13103-13115 <DOI:101021/la5028866>.
Goldman, R. et al., "Current Approaches to Resolving the Physiological Heat Stress Problems Imposed by Chemical Protective Clothing Systems", Defense Technical Information Center, Mar. 1976, 7 pages.
Gou, Y. et al., "Frost Formation on a Bionic Super-hydrophobic Surface Under Natural Convection Conditions", Heat Transfer-Asian Research, Oct. 2008, vol. 37, No. 7, pp. 412-420 <DOI:10.1002/htj.20216>.
Grryll, L. et al., "Development of a man-portable microclimate adsorption cooling device", IECEC-97 Proceedings of the Thirty-Second Intersociety Energy Conversion Engineering Conference (Honolulu, HI, Jul. 27-Aug. 1, 1997), 1997 (Date Added to IEEE Xplore: Aug. 2002), pp. 1646-1651 <DOI:10.1109/IECEC.1997.656668>.
Guadarrama-Cetina, J. et al., "Droplet pattern and condensation gradient around a humidity sink", Physical Review E, Jan. 2014, vol. 89, article 012402, 10 pages <DOI:10.1103/PhysRevE.89.012402>.
Guadarrama-Cetina, J. et al., "Frost formation with salt", Europhysics Letters, Jun. 2015, vol. 110, No. 5, article 56002, 6 pages <DOI:10.1209/0295-5075/110/56002>.
Guadarrama-Cetina, J. et al., "Percolation-induced frost formation", Europhysics Letters, Jan. 2013, vol. 101, No. 1, article 16009, 6 pages <DOI:10.1209/0295-5075/101/16009>.
Guo, P. et al., "Icephobic/Anti-Icing Properties of Micro/Nanostructured Surfaces", Advanced Materials, May 2012 (available online Apr. 2012), vol. 24, No. 19, pp. 2642-2648 <DOI:10.1002/adma.201104412>.
Hao, Q. et al., "Mechanism of Delayed Frost Growth on Superhydrophobic Surfaces with Jumping Condensates: More Than Interdrop Freezing", Langmuir, Dec. 2014, vol. 30, No. 51, pp. 15416-15422 <DOI:10.1021/la504166x>.
He, M. et al., "Superhydrophobic surface at low surface temperature", Applied Physics Letters, Mar. 2011, vol. 98, article 093118, 4 pages <DOI:10.1063/1.3558911>.

He, M. et al., "Super-hydrophobic surfaces to condensed microdroplets at temperatures below the freezing point retard ice/frost formation", Soft Matter, Mar. 2011, vol. 7, No. 8, pp. 3993-4000 <DOI:10.1039/C0SM01504K>.
Hejazi, V. et al., "From superhydrophobicity to icephobicity: forces and interaction analysis", Scientific Reports, Jul. 2013, vol. 3, article 2194, 6 pages <DOI:10.1038/srep02194>.
Hermes, C. et al., "A study of frost growth and densification on flat surfaces", Experimental Thermal and Fluid Science, Jan. 2009, vol. 33, No. 2, pp. 371-379 <DOI:10.1016/j.expthermflusci.2008.10.006>.
Hoke, J. et al., "Effect of Substrate Wettability on Frost Properties", Journal of Thermophysics and Heat Transfer, Apr.-Jun. 2004, vol. 18, No. 2, pp. 228-235 <DOI:10.2514/1.10176>.
Hu, J. et al., "A review of stimuli-responsive polymers for smart textile applications", Smart Materials and Structures, Apr. 2012, vol. 21, No. 5, article 053001, 23 pages <DOI:10.1088/0964-1726/21/5/053001>.
Huang, L. et al., "Experimental study on frost release on fin-and-tube heat exchangers by use of a novel anti-frosting paint", Experimental Thermal and Fluid Science, Oct. 2009, vol. 33, No. 7, pp. 1049-1054 <DOI:10.1016/j.expthermflusci.2009.06.002>.
Huang, L. et al., "Preparation and anti-frosting performance of super-hydrophobic surface based on copper foil", International Journal of Thermal Sciences, Apr. 2011, vol. 50, No. 4, pp. 432-439 <DOI:10.1016/j.jthermalsci.2010.11.011>.
Hydrobead—Superhydrophobic Water Repellent Spray Coating, available on or before Jan. 2, 2014, retrieved on Jul. 20, 2019, www.hydrobead.com, 2 pages.
Jing, T. et al., "Frosting and defrosting on rigid superhydrohobic surface", Applied Sufurace Science, Jul. 2013, vol. 276, pp. 37-42 <DOI:10.1016/j.apsusc.2013.02.105>.
Jung, S. et al., "Are Superhydrophobic Surfaces Best for Icephobicity?", Langmuir, Feb. 2011, vol. 27, No. 6, pp. 3059-3066 <DOI:10.1021/la104762g>.
Jung, S. et al., "Frost halos from supercooled water droplets", Proceedings of the National Academy of Sciences of the United States of America, Oct. 2012, vol. 109, No. 40, pp. 16073-16078 <DOI:10.1073/pnas.1206121109>.
Jung, S. et al., "Mechanism of supercooled droplet freezing on surfaces", Nature Communications, Jan. 2012, vol. 3, article 615, 8 pages <DOI:10.1038/ncomms1630>.
Kim, P. et al., "Hierarchical or Not? Effect of the Length Scale and Hierarchy of the Surface Roughness on Omniphobicity of Lubricant-Infused Substrates", Nano Letters, Mar. 2013, vol. 13, No. 4, pp. 1793-1799 <DOI:10.1021/nl4003969>.
Kreder, M. et al., "Design of anti-icing surfaces: smooth, textured or slippery?", Nature Reviews Materials, Jan. 2016, vol. 1, article 15003, 15 pp. <DOI:10.1038/natrevmats.2015.3>.
Kulinich, S. et al., "How Wetting Hysteresis Influences Ice Adhesion Strength on Superhydrophobic Surfaces", Langmuir, Jul. 2009, vol. 25, No. 16, pp. 8854-8856 <DOI:10.1021/la901439c>.
Kulinich, S. et al., "Ice adhesion on super-hydrophobic surfaces", Applied Surface Science, Jun. 2009 (available online May 2009), vol. 255, No. 18, pp. 8153-8157 <DOI:10.1016/j.apsusc.2009.05.033>.
Kulinich, S. et al., "On ice-releasing properties of rough hydrophobic coatings", Cold Regions Science and Technology, Jan. 2011 (available online Jan. 2010), vol. 65, No. 1, pp. 60-64 <DOI:10.1016/j.coldregions.2010.01.001>.
Kulinich, S. et al., "Superhydrophobic Surfaces: Are They Really Ice-Repellent?", Langmuir, 2011 (available online Dec. 2010), vol. 27, No. 1, pp. 25-29 <DOI:10.1021/la104277q>.
Lacroix, A. et al., "Wind Energy: Cold Weather Issues", University of Massachusetts at Amherst—Renewable Energy Research Laboratory, Jun. 2000, 17 pages.
Leach, R. et al., "Dropwise Condensation: Experiments and Simulations of Nucleation and Growth of Water Drops in a Cooling System", Langmuir, Sep. 2006, vol. 22, No. 21, pp. 8864-8872 <DOI:10.1021/la061901>.

(56) References Cited

OTHER PUBLICATIONS

Lee, H. et al., "Frost formation on a plate with different surface hydrophilicity", International Journal of Heat and Mass Transfer, Oct. 2004, vol. 47, No. 22, pp. 4881-4893 <DOI:10.1016/j.ijheatmasstransfer.2004.05.021>.

Lee, H. et al., "Zwitter-Wettability and Antifogging Coatings with Frost-Resisting Capabilities", ACS Nano, Jan. 2013, vol. 7, No. 3, pp. 2172-2185 <DOI:10.1021/nn3057966>.

Liu, J. et al., "Hierarchical nanostructures of cupric oxide on a copper substrate: controllable morphology and wettability", Journal of Materials Chemistry, Sep. 2006, vol. 16, No. 45, pp. 4427-4434 <DOI:10.1039/B611691D>.

Liu, Q. et al. "Durability of a lubricant-infused Electrospray Silicon Rubber surface as an anti-icing coating", Applied Surface Science, Aug. 2015, vol. 346, pp. 68-76 <DOI:10.1016/j.apsusc.2015.02.051>.

Liu, Z. et al., "Frost formation on a super-hydrophobic surface under natural convection conditions", International Journal of Heat and Mass Transfer, Dec. 2008, vol. 51, No. 25-26, pp. 5975-5982 <DOI:10.1016/j.ijheatmasstransfer.2008.03.026>.

Lv, J. et al. "Bio-Inspired Strategies for Anti-Icing", ACS Nano, Mar. 2014, vol. 8, No. 4, pp. 3152-3169 <DOI:10.1021/nn406522n>.

Maitra, T. et al., "Hierarchically nanotextured surfaces maintaining superhydrophobicity under severely adverse conditions", Nanoscale, 2014, vol. 6, pp. 8710-8719 <DOI:10.1039/C4NR01368A>.

Maitra, T. et al., "On the Nanoengineering of Superhydrophobic and Impalement Resistant Surface Textures below the Freezing Temperature", Nano Letters, 2014 (available online Dec. 2013), vol. 14, No. 1, pp. 172-182 <DOI:10.1021/nl4037092>.

Maitra, T. et al., "Supercooled Water Drops Impacting Superhydrophobic Textures", Langmuir, Aug. 2014, vol. 30, No. 36, pp. 10855-10861 <DOI:10.1021/la502675a>.

Marrero, T. et al., "Gaseous Diffusion Coefficients", Journal of Physical and Chemical Reference Data, 1972, vol. 1, No. 3, pp. 3-118.

Medici, M. et al., "Edge effects on water droplet condensation", Physical Review E, Dec. 2014, vol. 90, No. 6, article 062403, 12 pages <DOI:10.1103/PhysRevE.90.062403>.

Miljkovic, N. et al., "Jumping-Droplet-Enhanced Condensation on Scalable Superhydrophobic Nanostructured -Surfaces", Nano Letters, 2013 (available online Nov. 2012), vol. 13, No. 1, pp. 179-187 <DOI:10.1021/nl303835d>.

Mishchenko, L. et al., "Design of Ice-free Nanostructured Surfaces Based on Repulsion of Impacting Water Droplets", ACS Nano, Nov. 2010, vol. 4, No. 12, pp. 7699-7707 <DOI:10.1021/nn102557p>.

Mishchenko, L. et al., "Spatial Control of Condensation and Freezing on Superhydrophobic Surfaces with Hydrophilic Patches", Advanced Functional Materials, 2013, vol. 23, pp. 4577-4584 <DOI:10.1002/adfm.201300418>.

Mockenhaupt, B. et al., "Superhydrophobicity of Biological and Technical Surfaces under Moisture Condensation: Stability in Relation to Surface Structure", Langmuir, Oct. 2008, vol. 24, No. 23, pp. 13591-13597 <DOI:10.1021/la802351h>.

Na, B. et al., "A fundamental understanding of factors affecting frost nucleation", International Journal of Heat and Mass Transfer, Sep. 2003, vol. 46, No. 20, pp. 3797-3808 <DOI:10.1016/S0017-9310(03)00194-7>.

Nath, S. et al., "A Review of Condensation Frosting", Nanoscale and Microscale Thermophysical Engineering, Jan. 2017, vol. 21, No. 2, pp. 81-101 <DOI:10.1080/15567265.2016.1256007>.

Nath, S. et al., "On Localized Vapor Pressure Gradients Governing Condensation and Frost Phenomena", Langmuir, Jul. 2016, vol. 32, No. 33, pp. 8350-8365 <DOI:10.1021/acs.langmuir6b01488>.

Nosonovsky, M. et al., "Why Superhydrophobic Surfaces Are Not Always Icephobic", ACS Nano, Sep. 2012, vol. 6, No. 10, pp. 8488-8491 <DOI:10.1021/nn302138r>.

Oberli, L. et al., "Condensation and freezing of droplets on superhydrophobic surfaces", Advances in Colloid and Interface Science, Aug. 2014, vol. 210, pp. 47-57 <DOI:10.1016/j.cis.2013.10.018>.

Ozbay, S. et al., "Improved Icephobic Properties on Surfaces with a Hydrophilic Lubricating Liquid", ACS Applied Materials and Interfaces, Sep. 2015, vol. 7, No. 39, pp. 22067-22077 <DOI:10.1021/acsami.5b07265>.

Ryerson, C., "Assessment of Superstructure Ice Protection as Applied to Offshore Oil Operations Safety", Defense Technical Information Center, Sep. 2008, 155 pages.

Rykaczewski, K. et al., "Dropwise Condensation of Low Surface Tension Fluids on Omniphobic Surfaces", Scientific Reports, Mar. 2014, vol. 4, No. 4158, 8 pages <DOI:10.1038/srep04158>.

Rykaczewski, K. et al., "How nanorough is rough enough to make a surface superhydrophobic during water condensation?", Soft Matter, Jul. 2012, vol. 8, No. 33, pp. 8786-8794 <DOI:10.1039/C2SM25502B>.

Rykaczewski, K. et al., "Methodology for Imaging Nano-to-Microscale Water Condensation Dynamics on Complex Nanostructures", ACS Nano, Jun. 2011, vol. 5, No. 7, pp. 5962-5968 <DOI:10.1021/nn201738n>.

Rykaczewski, K. et al., "Multimode Multidrop Serial Coalescence Effects during Condensation on Hierarchical Superhydrophobic Surfaces", Langmuir, 2013 (available online Dec. 2012), vol. 29, No. 3, pp. 881-891 <DOI:10.1021/la304264g>.

Sayward, J., "Seeking Low Ice Adhesion", Special Report 79-11 of the U.S. Army Cold Regions Research and Engineering Laboratory (Hanover, NH), 1979, 88 pages.

Schäfle, C. et al., "Subpattern formation during condensation processes on structured substrates", Europhysics Letters, Aug. 2003, vol. 63, No. 3, pp. 394-400.

Schutzius, T. et al., "Physics of Icing and Rational Design of Surfaces with Extraordinary Icephobicity", Langmuir, 2015 (available online Oct. 2014), vol. 31, No. 17, pp. 4807-4821 <DOI:10.1021/la502586a>.

Shin, J. et al., "Experimental Study on Frost Structure on Surfaces With Different Hydrophilicity: Density and Thermal Conductivity", Journal of Heat Transfer, Jan. 2003, vol. 125, No. 1, pp. 84-94 <DOI:10.1115/1.1518496>.

Smith, J. et al., "Droplet mobility on lubricant-impregnated surfaces", Soft Matter, Dec. 2012, vol. 9, No. 6, pp. 1772-1780 <DOI:10.1039/C2SM27032C>.

Speckman, K. et al., "Perspectives in microclimate cooling involving protective clothing in hot environments", International Journal of Industrial Ergonomics, Dec. 1988, vol. 3, No. 2, pp. 121-147 <DOI:10.1016/0169-8141 (88)90015-7>.

Sun, X. et al., "Bioinspired Stimuli-Responsive and Antifreeze-Secreting Anti-Icing Coatings", Advanced Materials and Interfaces, 2015, vol. 2, article 1400479, 15 pages <DOI:10.1002/admi.201400479>.

Sun, X. et al., "Inhibition of Condensation Frosting by Arrays of Hygroscopic Antifreeze Drops", Langmuir, Dec. 2015, vol. 31, No. 51, pp. 13743-13752 <DOI:10.1021/acs.langmuir.5b03869>.

Sun, X., "Bioinspired Anti-Icing Coatings and Spatial Control of Nucleation using Engineered Integral Humidity Sink Effect", PhD Thesis, May 2017 [retrieved Jun. 27, 2019] 127 pages, retrieved from the Internet: <https://search-proquest-com.ezproxy1.lib.asu.edu/docview/1896107173/CC99A784E5714CA2PQ/1?accountid=4485>.

Tourkine, P. et al., "Delayed Freezing on Water Repellent Materials", Langmuir, Jun. 2009, vol. 25, No. 13, pp. 1214-7216 <DOI:10.1021/la900929u>.

Viovy, J. et al., "Scaling description for the growth of condensation patterns on surfaces", Physical Review A, Jun. 1988, vol. 37, No. 12, pp. 4965-4970.

* cited by examiner

NANOPOROUS MATERIALS, METHOD OF MANUFACTURE AND METHODS OF USE

RELATED APPLICATIONS

This application claims priority to U.S. provisional application Ser. No. 62/452,785, filed on Jan. 31, 2017, the entire contents of which are incorporated herein by reference.

BACKGROUND

Frost and ice accumulation are a major safety and efficiency concern for aircraft, sea vessels, wind turbines, off-shore oil platforms, and other critical infrastructure. A common and effective way of preventing ice accretion is to dispense freezing point depressants. For example, prior to take-off in wintery conditions, airplanes are often sprayed with antifreeze liquids such as ethylene glycol. To prevent antifreeze depletion during flight, commercially available weeping wing systems can continuously dispense antifreeze over the wings through an active pumping system (see for example Ryerson in C. C., in "Assessment of superstructure ice protection as applied to offshore oil operations safety: ice protection technologies, safety enhancements, and development needs", in Engineer research and development center, Hanover, N.H. cold regions research and engineering lab: 2009). For small airplanes, about 4 to 8 liters of the antifreeze liquid are dispensed per hour. However, the high cost of the active dispensing system and fairly large quantities of antifreeze make it unlikely to be adopted in other applications such as large airplanes and ships. Moreover, the complexity of these systems can limit their scalability for emerging miniaturized devices such as unmanned aerial vehicles.

In order to reduce the use of antifreeze, and eliminate complex dispensing systems, semi-porous coatings that wick in the antifreeze from a reservoir have been developed (see for example the Feltwick Grating in Ryerson, and Chang, Y. S., in Performance Analysis of Frostless Heat Exchanger by Spreading Antifreeze Solution on Heat Exchanger Surface. Journal of Thermal Science and Technology 2011, 6, (1), 123-131, and Chang, Y. S.; Yun, W. N., in An Experimental Study on the Frost Prevention using Micro Liquid Film of an Antifreeze Solution. International Journal of Air-Conditioning and Refrigeration 2006, 14, (2), 66-75). However, in these systems, the antifreeze can be rapidly diluted by rain or atmospheric precipitation, or by sea water spray created by spindrift spray ripped from tops of waves by wind, or by splashing of sea water against the ship (see Ryerson cited above).

As an alternative to active anti-icing systems, a number of passive bio-inspired coatings have been recently proposed; however, their functionality is often limited to a particular set of environmental conditions. Examples of such coatings include nanostructured superhydrophobic surfaces that slow ice accumulation by repelling sub-cooled water droplets, but when frosted over, increase ice accretion and adhesion (see for example Varanasi, K. K.; Deng, T.; Smith, J. D.; Hsu, M.; Bhate, N., in "Frost formation and ice adhesion on superhydrophobic surfaces", Applied Physics Letters 2010, 97, (23), 234102). Similarly, it was recently demonstrated that the condensation and frost inhibiting functionality of lubricant-impregnated surfaces (LIS) can be compromised due to lubricant drainage into nucleating frost consisting of network on nano-iciles (see for example Rykaczewski, K.; Anand, S.; Subramanyam, S. B.; Varanasi, K. K., in "Mechanism of Frost Formation on Lubricant Impregnated Surfaces", Langmuir 2013, 29, (17), 5230-5238).

The onset of frost growth can occur directly through desublimation or indirectly through condensation of droplets followed by their freezing (i.e. condensation frosting). In both desublimation and condensation, the nuclei formation rate per unit area, I, can be expressed according to Becker-Döring embryo formation kinetics as:

$$I = I_0 \exp(-\Delta G_c/kT_{sur}) \quad (1)$$

where $I_0$ is the kinetic prefactor, $\Delta G_c$ is the critical Gibbs energy change for nucleation, $T_{sur}$ is temperature of the surface and k is the Boltzmann constant. At the critical embryo size, $\Delta G_c$ is defined by:

$$\Delta G_c = \frac{4\pi\sigma^3 V_m^2 (2 - 3\cos\theta + \cos^3\theta)}{3\left(\overline{R}T_{sur}\ln\left(\frac{P}{P_{sat}}\right)\right)^2} \quad (2)$$

Where $\theta$ is the contact angle of the embryo in contact with the solid, $\sigma$ is either the liquid-vapor or the ice-vapor surface energy, $\overline{R}$ is the ideal gas constant, and $V_m$ is the molar volume of the liquid, P is the partial pressure of water vapor in the surrounding, and $P_{SAT}$ is the water vapor saturation pressure at the surface temperature. Equations 1 and 2 imply that frost formation can be significantly delayed (i.e. nucleation rate decreased) by increasing $\theta$. Since it only requires modification of the surface chemistry, this approach to frost inhibition has been thoroughly studied.

To surpass the limits of hydrophobicity created by chemistry alone, nanoscale and microscale surface texturing has been used to develop superhydrophobic anti-frosting surfaces. However, the macroscopically high contact angle of such surfaces (>150°) does not necessarily translate into a decrease of the nucleation rate compared to flat hydrophobic surface because nuclei can form in-between the surface features or follow alternative growth pathways. On some superhydrophobic surfaces, however, frost growth can be delayed through other physical mechanisms such as condensate ejection upon coalescence. Another approach for spatial control of vapor nucleation is disruption of a hydrophobic surface with hydrophilic patterns onto which droplets can condense preferentially. Other work has demonstrated that the spread of frost can be prevented by intelligently spacing these preferential condensation areas. Specifically, if the droplets are spaced sufficiently far apart, they cannot be connected by an ice bridge originating from one of them (the ice bridge acts as a humidity sink and its growth is fed by evaporation of the unfrozen droplet). While promising, it is unclear if this effect, as well as droplet ejection, can be used to inhibit frost in industrial setting where hydrophobic coatings are prone to damage.

In addition to decreasing surface wettability, Equations 1 and 2 suggest that the onset of frost formation can be significantly delayed through the decrease of the nucleation rate via reduction of the local water vapor pressure above the surface. This task is significantly more difficult to achieve than engineering reduced surface wettability and has only recently been explored. Some studies have demonstrated that water vapor pressure can be locally depressed below the saturation pressure through the presence of a hygroscopic material. Specifically, a region of inhibited condensation and condensation frosting (RIC) forms around a salty water drop. The water vapor concentration at the surface of a hygroscopic liquid (from ideal gas law $C_{HS} = P_{HS}/\overline{R}T_{HS} = P_{HS}/$ $\overline{R}T_{sur}$) is lower than the saturation concentration ($C_{SAT}=P_{SAT}/\overline{R}T_{sur}$), producing a locally decreased water vapor concentration that can be viewed as a "humidity sink". The RIC has also been observed during condensation of water and of diethlyene glycol as well as during nucleation of calcite crystals. Other studies have shown that a significant delay in surface frosting can be achieved by arranging drops of hygroscopic liquid in an orderly array so that the individual RICs overlap (e.g., see Sun, X.; Damle, V. G.; Uppal, A.; Linder, R.; Chandrashekar, S.; Mohan, A. R.; Rykaczewski, K. Inhibition of Condensation Frosting by Arrays of Hygroscopic Antifreeze Drops. Langmuir 2015, 31, 13743-1007 13752. This integral humidity sink effect was also implied by the long delay in condensation observed on bi-layer, antifreeze-infused, anti-icing coatings. These coatings consist of a porous, superhydrophobic, outer layer and a hydrophilic inner layer that contains a hygroscopic antifreeze (all common antifreezes are hygroscopic). This hybrid coating delays the formation of glaze and rime by repelling impacting drops and, once the pores are flooded, counteracts frost formation through the diffusive release of the antifreeze (presence of this liquid also lowers ice adhesion once if it eventually forms). This approach is a hybrid between fully passive coatings and antifreeze flooding technique commonly used in industry. Instead of getting rid of the antifreeze entirely, this anti-icing method reduces its operational costs and environmental impact by minimizing the amount of antifreeze used (up to 8-fold). The observed delay in frost formation as well as pinning of impacting drops during freezing rain suggests that the water vapor pressure was altered above the bi-coating.

Accordingly, there exists a need to provide surfaces or coating technologies that provide anti-icing functionality for structures and vehicles of all sizes operating in a wide range of environmental conditions on land, on the sea, and in the air.

SUMMARY

Some embodiments of the invention include a coating or film assembly comprising a first layer at least partially infused with at least one antifreeze material, and a second layer at least partially coupled to at least a portion of the first layer. In some embodiments, at least a portion of the second layer comprises pores with a defined spacing. In some embodiments, at least a portion of the second layer is configured and arranged to be rendered hydrophilic in the presence of absorbed moisture or phases of ice including frost, rime, and/or glaze. Further, in some embodiments, at least a portion of the first layer is configured and arranged to enable the antifreeze material to migrate through and out of the first layer into at least a portion of a hydrophilic region of the second layer.

In some embodiments, the at least one antifreeze material includes a composition able to depress the freezing point of water. In some embodiments, the coating or film assembly is coupled to a supply of the at least one antifreeze material. In some embodiments, the antifreeze material includes an alkylene glycol, a glycol containing polymer, a water-soluble alcohol, a dicarboxylic acid, or salt thereof, and/or an anti-freeze protein.

In some embodiments of the invention, the first layer includes at least a first side and a second side, and an interior volume between the first and second sides. In some embodiments, the first side and the second side comprises a hydrophilic or superhydrophilic material. In some further embodiments, at least the interior volume includes a porosity comprising voids. In other embodiments, the interior volume includes interconnected and/or isolated capillaries. In some further embodiments, least one of the first layer and the second layer comprises nanopores. In some embodiments, at least the interior volume is configured and arranged to form at least one reservoir capable of holding or retaining fluid.

In some embodiments of the invention, the first layer comprises a hydrophilic or superhydrophilic polymer. In some embodiments, the first layer and/or the second layer includes a nylon-based homopolymer, nylon-based copolymer, a nylon-based polymer blend, Poly(N-isopropylacrylamide), a Polyacrylamide based polymer, a Poly (2-oxazoline) and Polyethylenimine based copolymer, an acrylic-based polymer, a Poly(ethylene glycol) based polymer, a Poly(ethylene oxide) based polymer, a Poly(vinyl alcohol) (PVA) based polymer, and/or a Poly(vinylpyrrolidone) based polymer.

In some embodiments, the second layer comprises a permeable outer omniphobic shell, layer, or coating configured and arranged to form a superhydrophobic surface. In some further embodiments, the first layer comprises a superhydrophilic nylon polymer with at least one superhydrophobic coating. In some embodiments, the coating includes silicone or siloxane polymer, halogenated polymers, halosilane based polymers, epoxy matrix materials with hydrophobic nanoparticle additives including at least one of fumed silica, Polytetrafluoroethylene particles, nanocarbon particles, and/or siloxanes.

Some embodiments of the invention include a coating method comprising applying a first layer comprising porosity, and applying a second layer to at least a portion of the first layer, the second layer comprising pores with a defined spacing, and being at least partially coupled to at least a portion of the first layer. In some embodiments, the method includes coupling at least a portion of the first layer to a supply of at least one antifreeze material. In some embodiments, the method includes infusing at least at least a portion of the first layer with at least a portion of the at least one antifreeze material. In some embodiments, at least a portion of the second layer is rendered hydrophilic in the presence of absorbed moisture or phases of ice including frost, rime, and/or glaze. In some other embodiments, at least a portion of the first layer enables the antifreeze material to migrate through and out of the first layer into at least a portion of a hydrophilic region of the second layer.

In some embodiments, the at least one antifreeze material includes a composition able to depress the freezing point of water. In some embodiments, the antifreeze material includes an alkylene glycol, a glycol containing polymer, a water-soluble alcohol, a dicarboxylic acid, or salt thereof, and/or an anti-freeze protein. In some further embodiments, the first layer and the second layer comprises nanopores. In some embodiments, the first layer and/or the second layer includes at least one of a nylon-based homopolymer, nylon-based copolymer, a nylon-based polymer blend, Poly(N-isopropylacrylamide), a Polyacrylamide based polymer, a Poly (2-oxazoline) and Polyethylenimine based copolymer, an acrylic-based polymer, a Poly(ethylene glycol) based polymer, a Poly(ethylene oxide) based polymer, a Poly(vinyl alcohol) (PVA) based polymer, and/or a Poly(vinylpyrrolidone) based polymer.

as a function of surface temperature, $T_{surface}$, for fixed boundary layer temperature of $T_{BL}=298$ K in accordance with some embodiments of the invention.

Figure 4A:
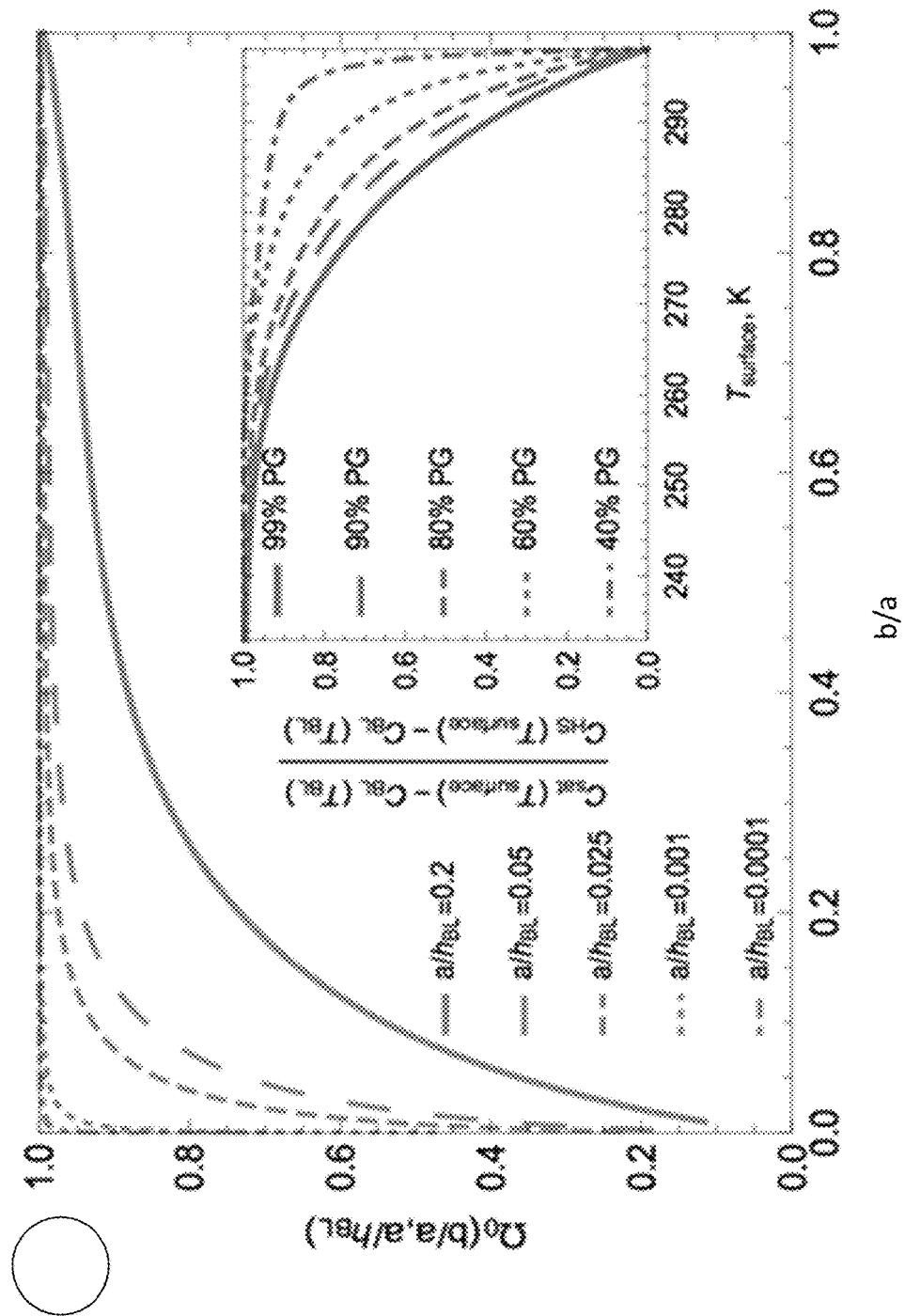
FIG. 4A shows a plot of $\Omega_0$ as a function of non-dimensional pore size, b/a, for various ratios of the array unit cell size to boundary layer thickness, and the inset shows variation of the excess saturation to pore surface concentration ratio, $$\frac{C_{sat}(T_{surface}) - C_{BL}(T_{BL})}{C_{HS}(T_{surface}) - C_{BL}(T_{BL})},$$
Figure 4B:
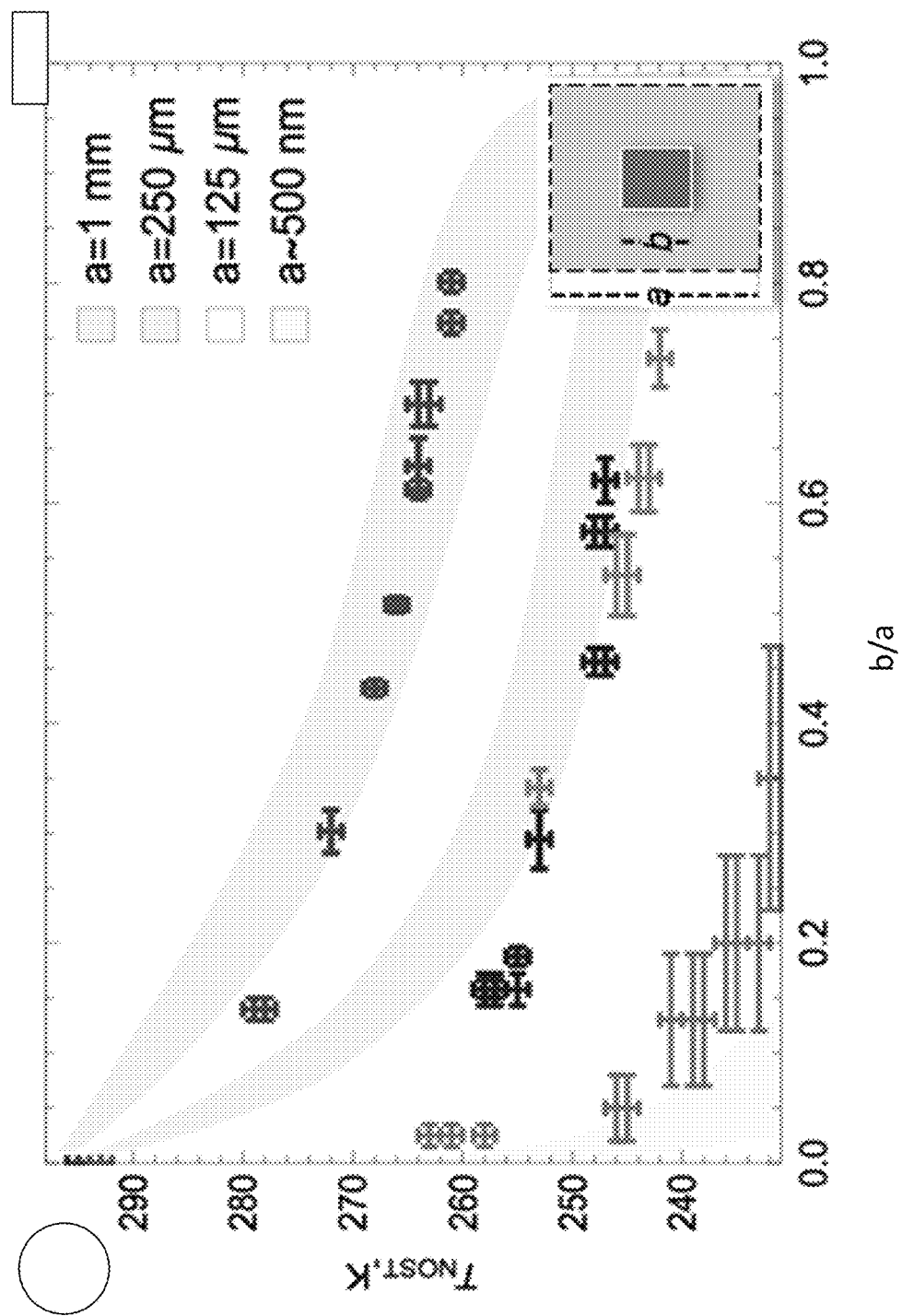

FIG. 4B shows a plot of theoretically predicted (shaded areas) and experimentally measured nucleation onset surface temperature, $T_{NOST}$, as a function of b/a for various $a/h_{BL}$ ratios in accordance with some embodiments of the invention.

Figure 4C:
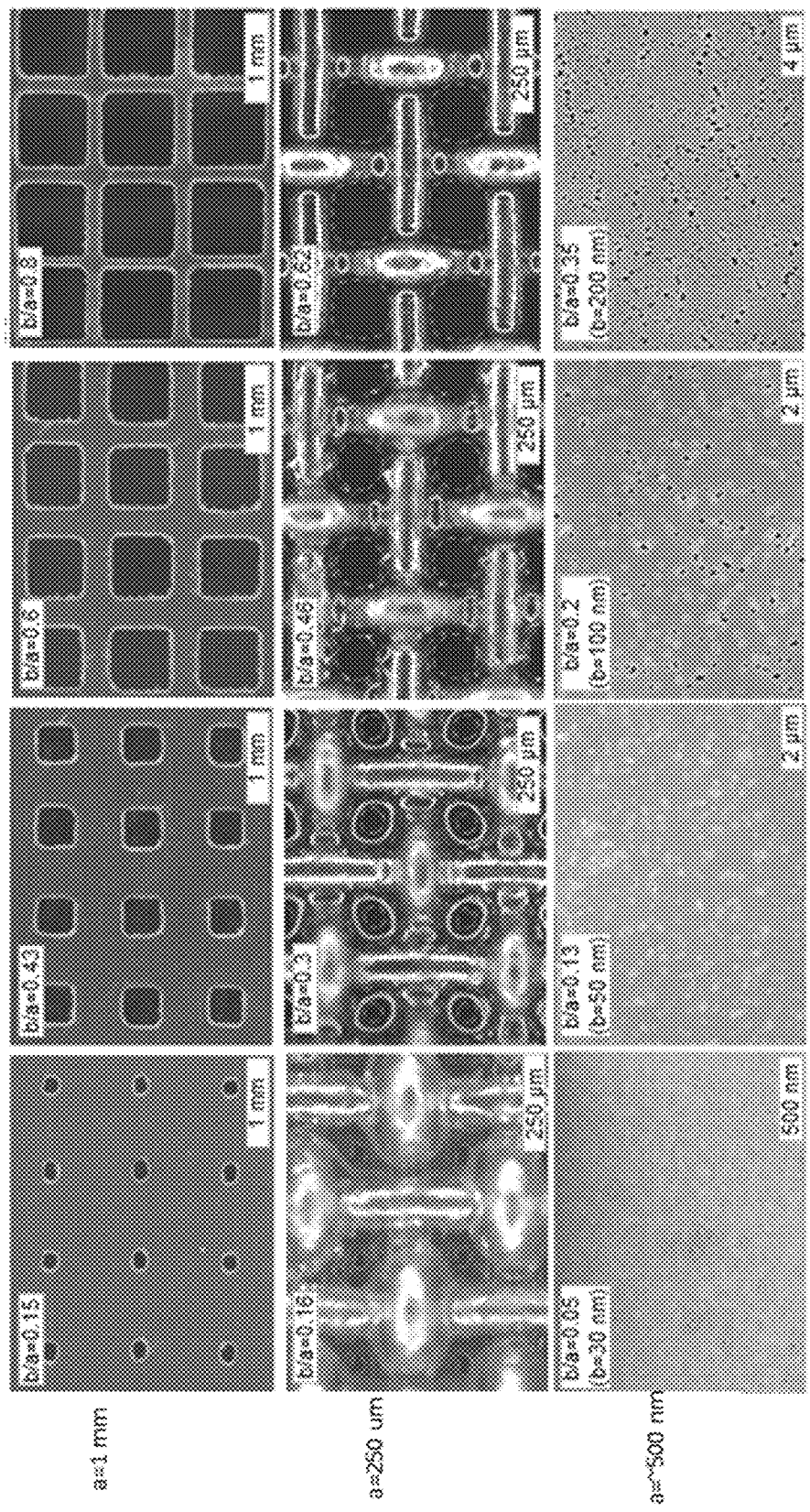

FIG. 4C shows complete icing over of the nanoporous bi-layer propylene glycol infused coatings cooled to 263 K, 253 K, and 243 K in water saturated environment at 298 K in accordance with some embodiments of the invention.

Figure 5A:
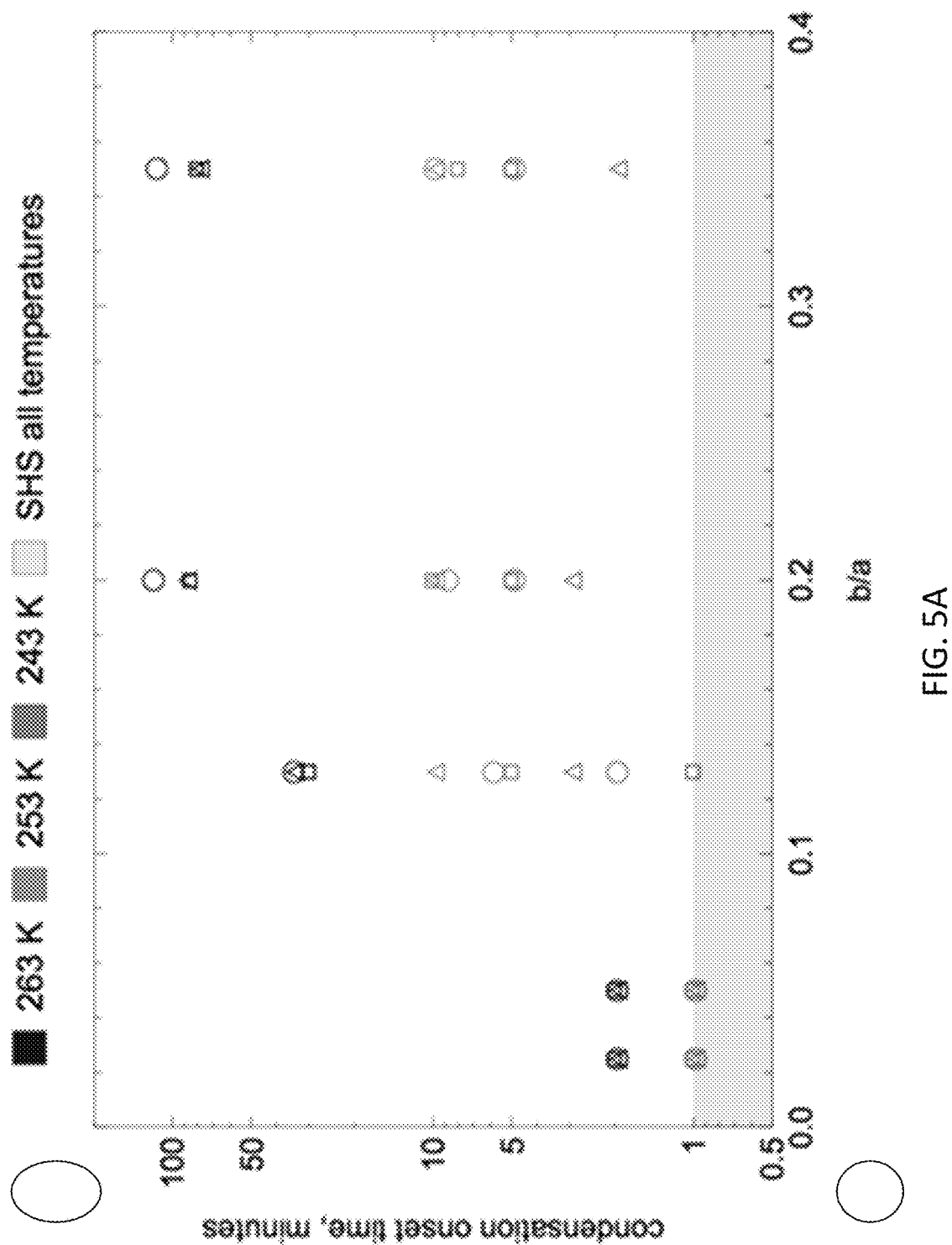

FIG. 5A shows plots quantifying the times required for condensation onset of the nanoporous bi-layer propylene glycol infused coatings cooled to 263 K, 253 K, and 243 K in water saturated environment at 298 K in accordance with some embodiments of the invention.

Figure 5B:
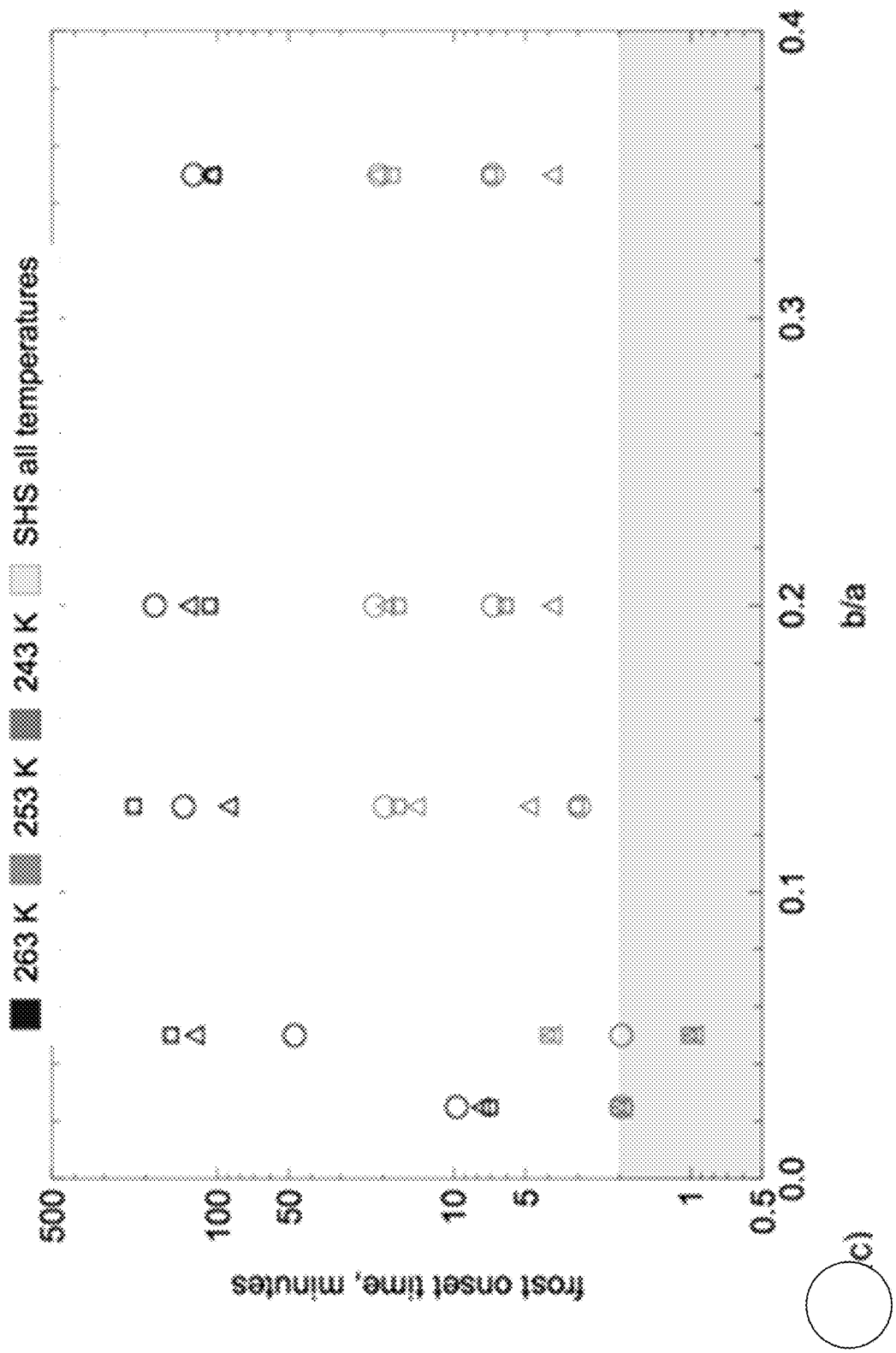

FIG. 5B shows plots quantifying the times required for frost onset of the nanoporous bi-layer propylene glycol infused coatings cooled to 263 K, 253 K, and 243 K in water saturated environment at 298 K in accordance with some embodiments of the invention.

Figure 5C:
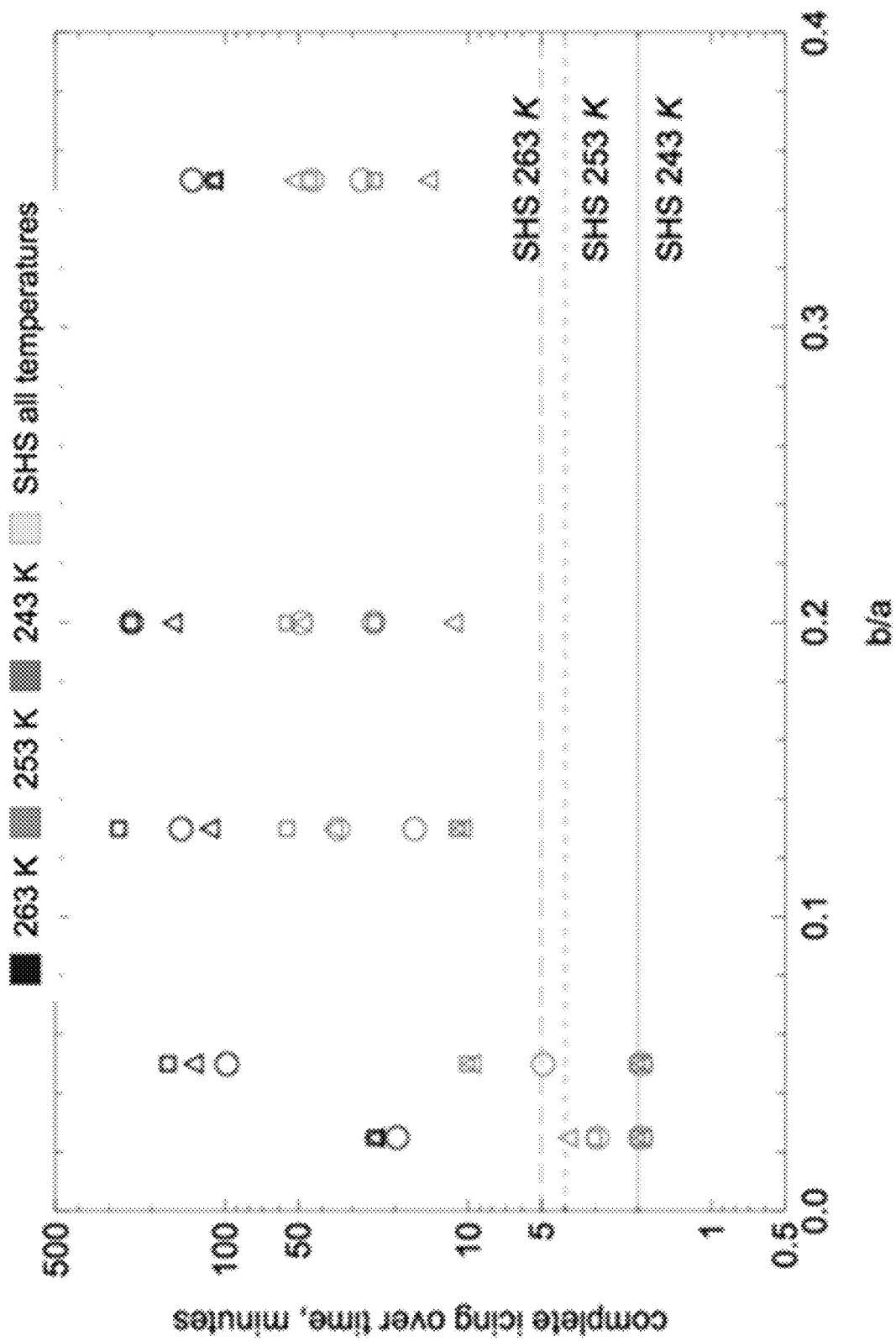

FIG. 5C shows plots quantifying the times required for complete icing over of the nanoporous bi-layer propylene glycol infused coatings cooled to 263 K, 253 K, and 243 K in water saturated environment at 298 K in accordance with some embodiments of the invention.

Figure 6A:
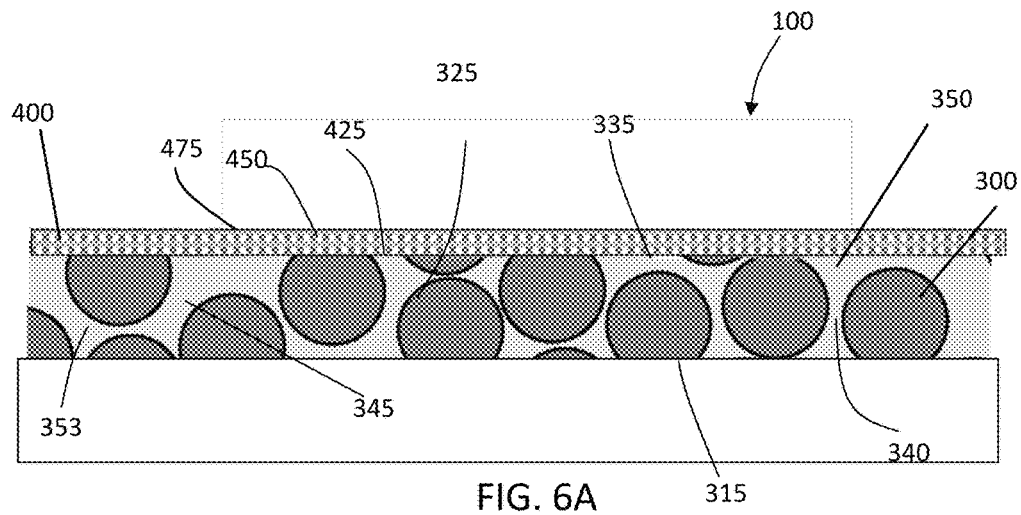

FIG. 6A is a cross-sectional view of a condensation and frost inhibiting coating or film assembly according to some embodiments of the invention.

Figure 6B:
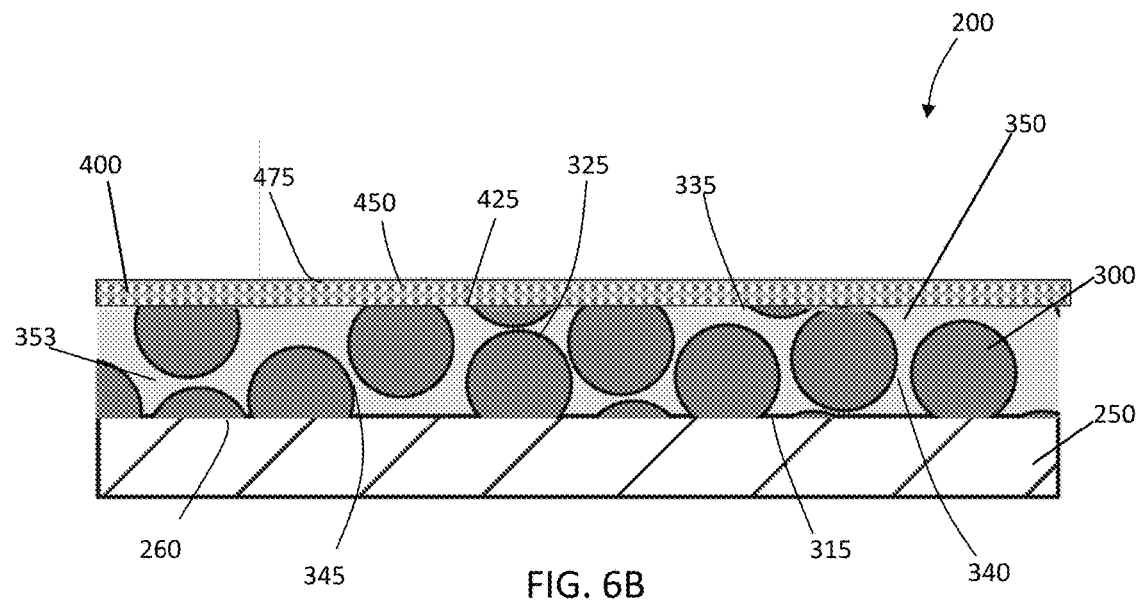

FIG. 6B is a cross-sectional view of a coated surface according to some embodiments of the invention.

Figure 6C:
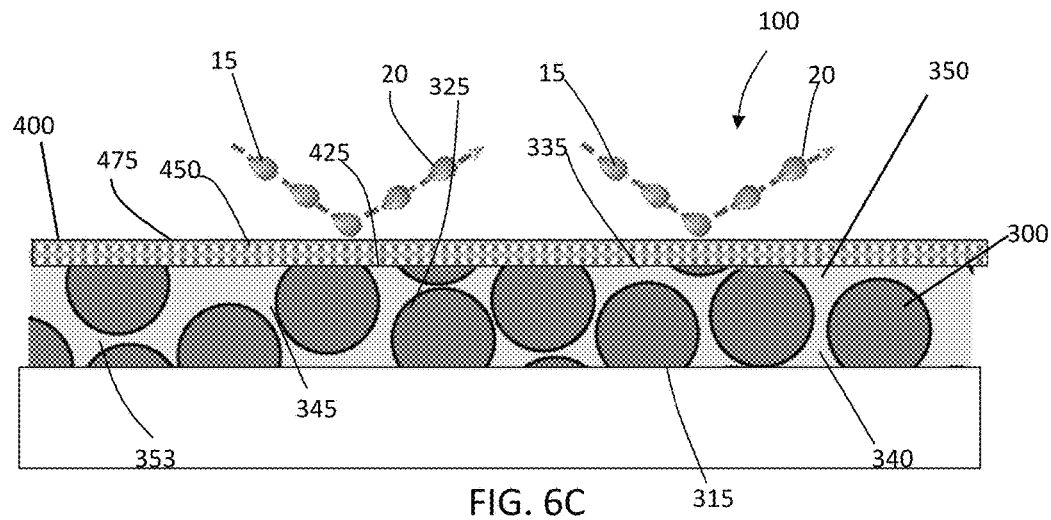

FIG. 6C is a cross-sectional view of the condensation and frost inhibiting coating or film assembly of FIG. 6A illustrating water repellent properties according to some embodiments of the invention.

Figure 6D:
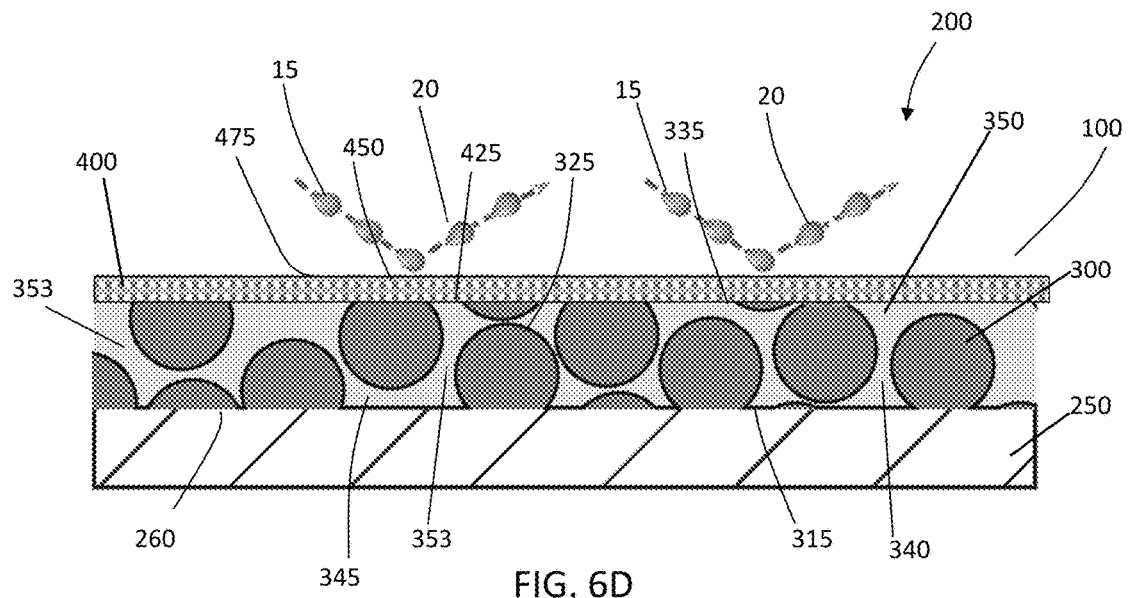

FIG. 6D is a cross-sectional view of the coated surface of FIG. 6B illustrating water repellent properties according to some embodiments of the invention.

Figure 7A:
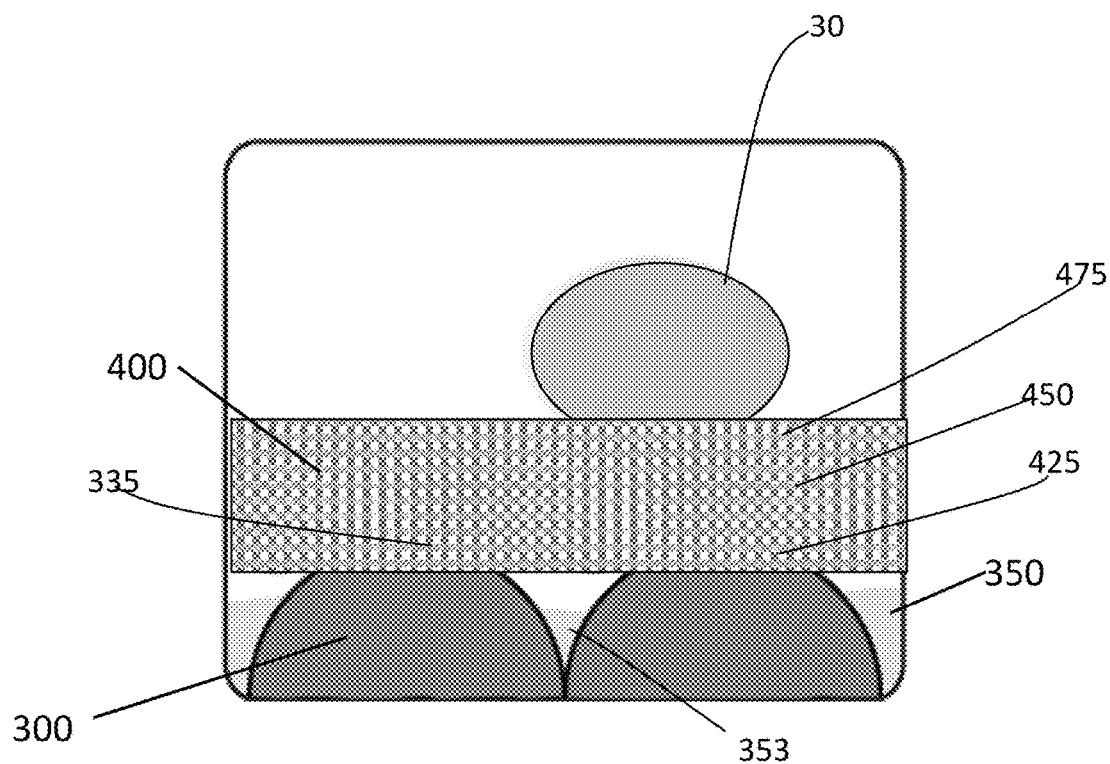

FIG. 7A is a close-up cross-sectional view of a portion of a condensation and frost inhibiting coating illustrating condensation in accordance with some embodiments of the invention.

Figure 7B:
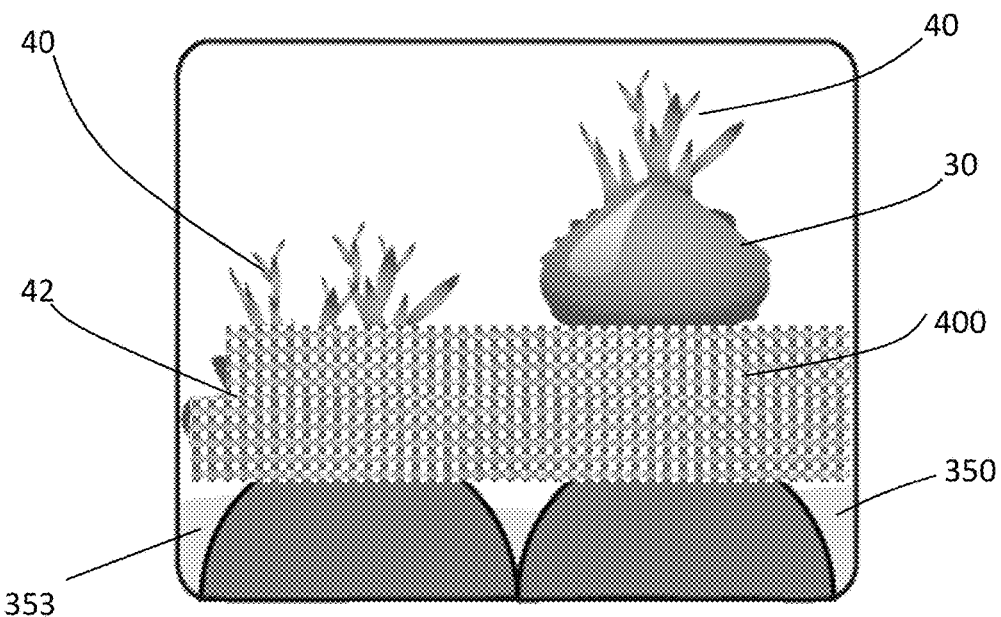

FIG. 7B is a close-up cross-sectional view of a portion of a coating illustrating de-sublimation and condensation frosting in accordance with some embodiments of the invention.

Figure 7C:
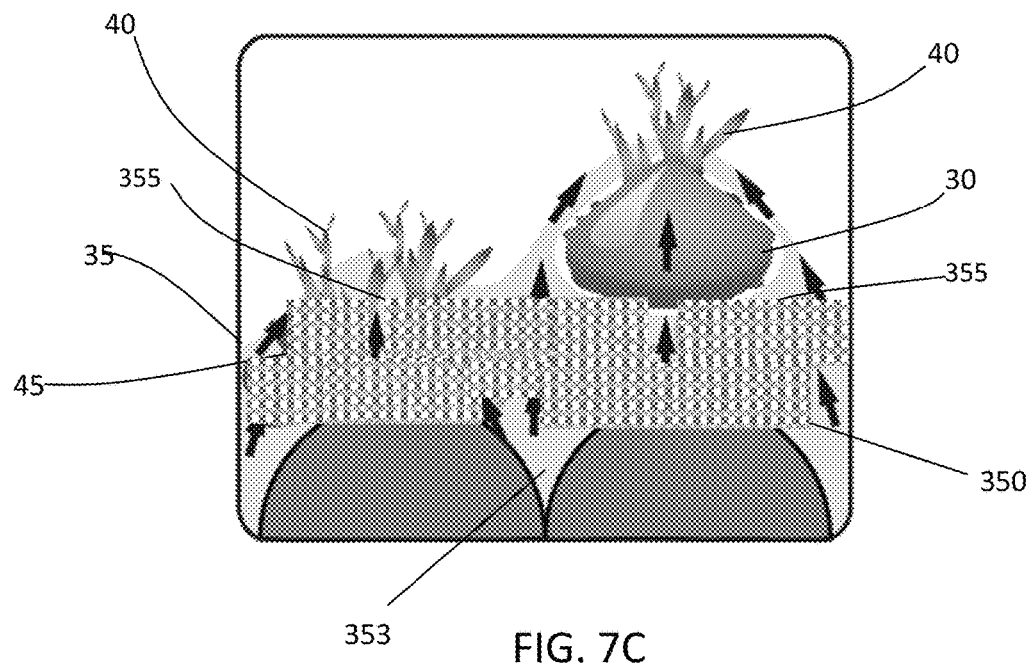

FIG. 7C is close-up cross-sectional view of a portion of a coating illustrating antifreeze release subsequent to the de-sublimation and condensation frosting illustrated in FIG. 7B in accordance with some embodiments of the invention.

Figure 7D:
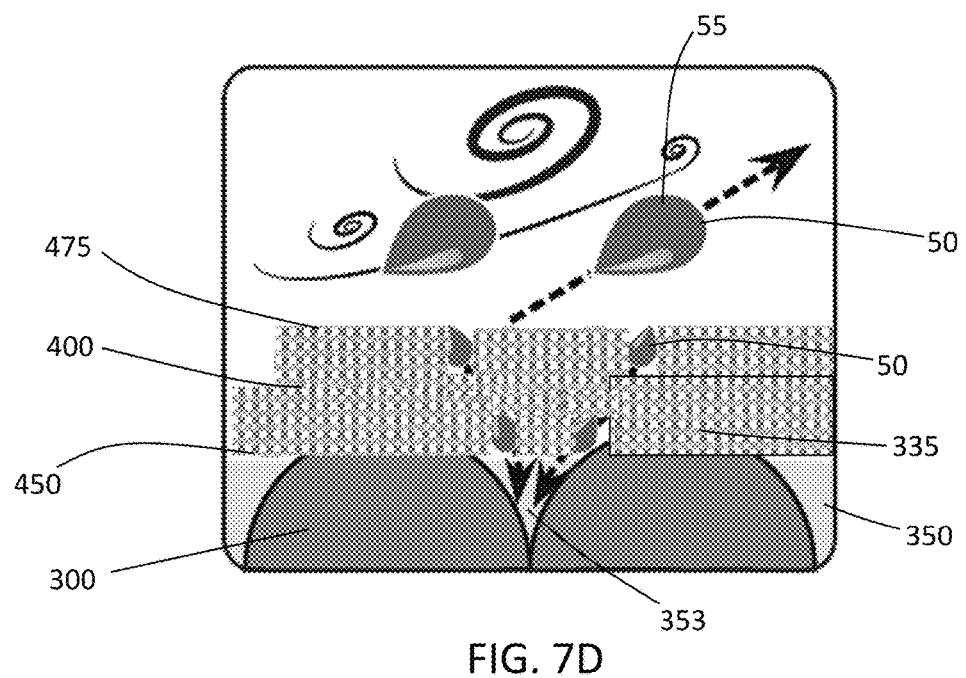

FIG. 7D is close-up cross-sectional view of a portion of a coating illustrating water and antifreeze departure subsequent to the antifreeze release illustrated in FIG. 7C in accordance with embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Described herein are multifunctional coatings, layers, and/or surfaces that can comprise three dimensional (hereinafter as "7D") heterogeneities. The multifunctional coatings, layers, and/or surfaces can be used to form at least a portion of a surface or substrate that comprises anti-icing properties. Further, the multifunctional coatings, layers, and/or surfaces can be used to render at least a portion of a surface or substrate to an anti-icing surface or substrate. As used herein, a surface or substrate exhibiting an anti-icing characteristic and/or properties can be any surface or substrate that prevents, inhibits, or delays the nucleation and/or growth of one or more frost or ice crystals. Further, as used herein, frost can comprise any number of ice particles or ice crystals that can be at least partially coupled to at least a portion of a surface. The ice crystals can form via different routes such as, for example, frosting, condensation frosting, misting/fog freezing, or larger droplet impingement as in freezing rain.

Figure 1A:
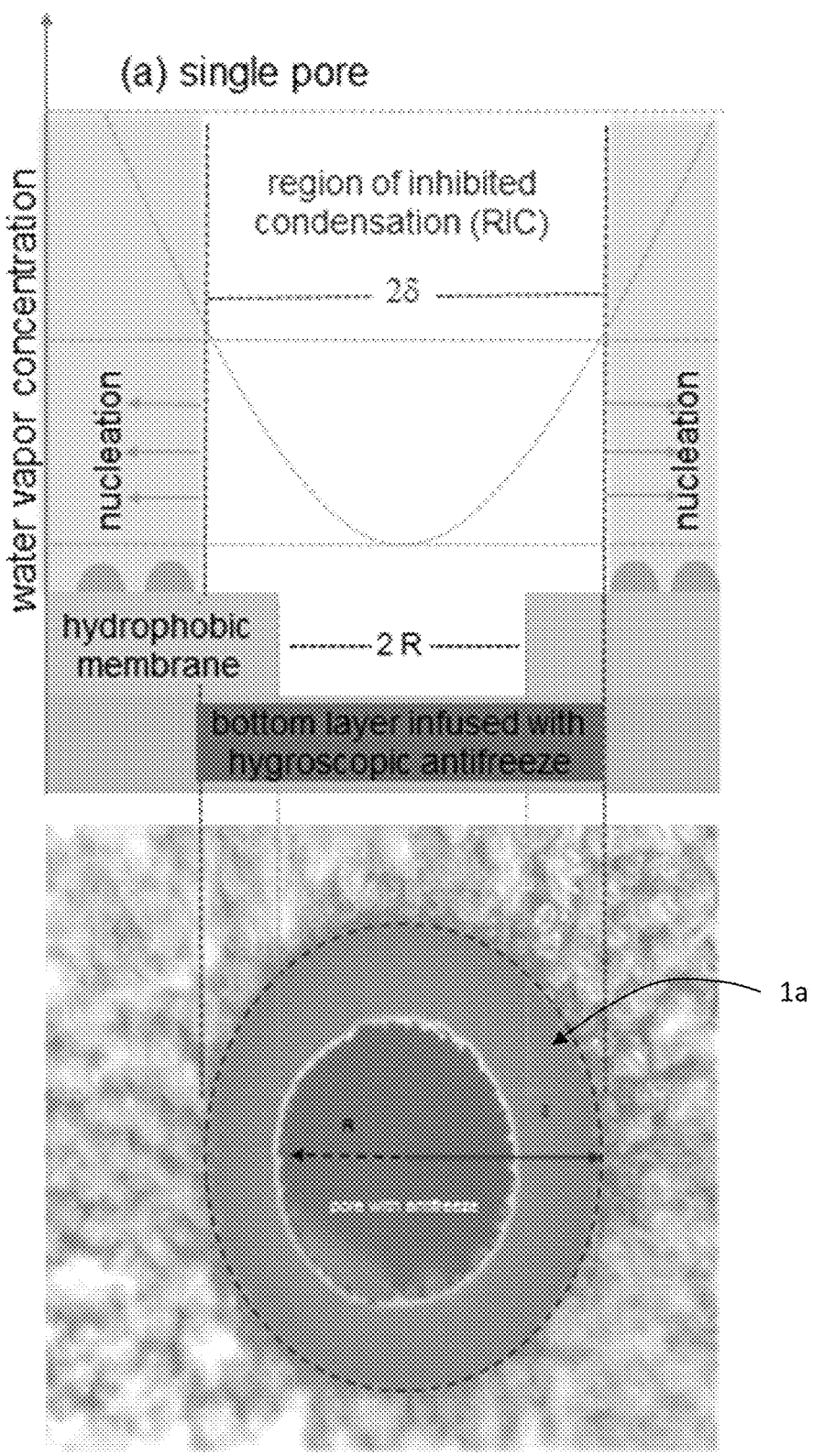
FIG. 1A shows an illustration of condensation frosting inhibition on a bi-layer coating infused with propylene glycol with (a) an individual pore with diameter of 500 μm and (b & c) 4 by 4 square pore array in the outer membrane according to some embodiments of the invention.
Figure 1B:
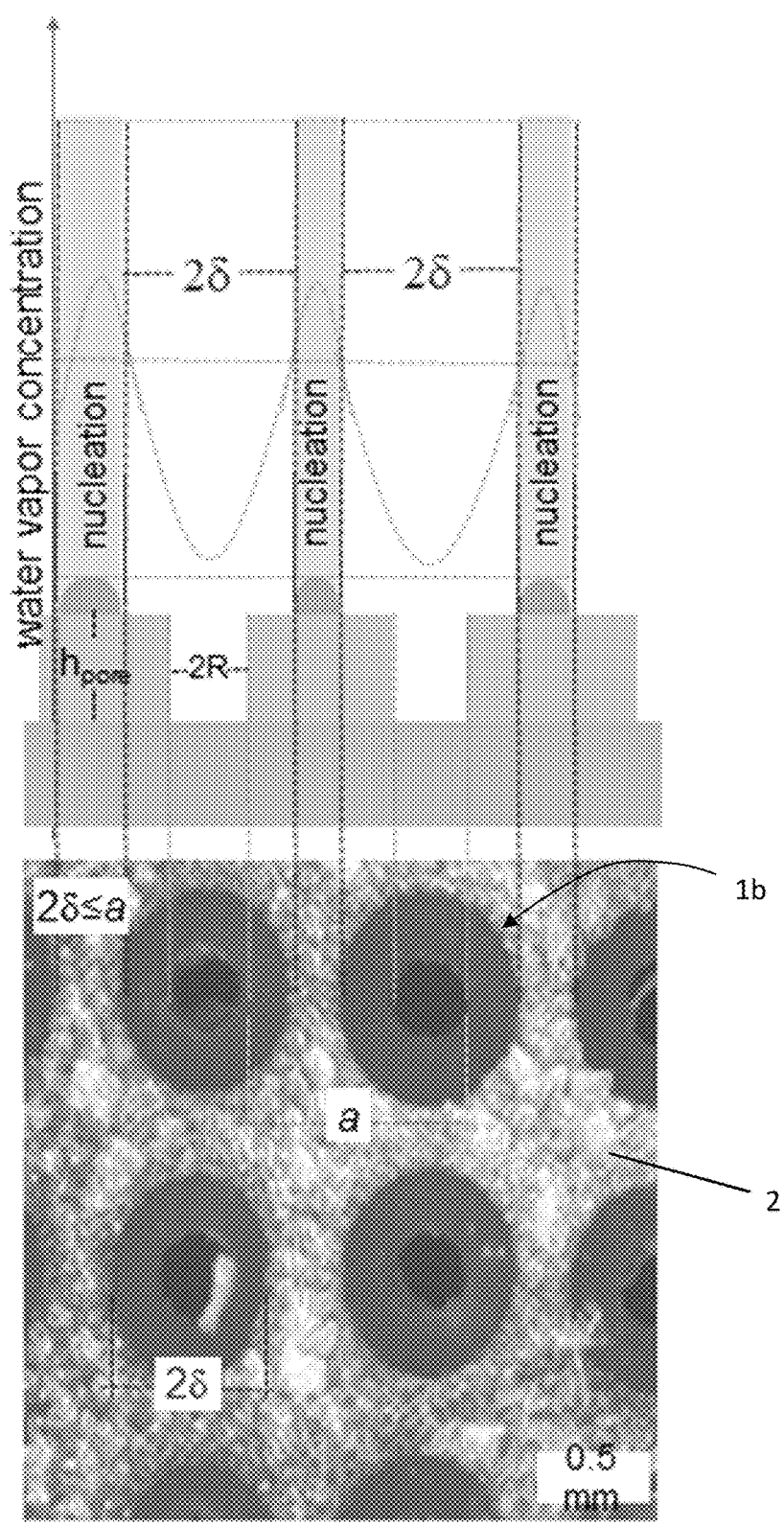
FIGS. 1B and 1C illustrate condensation frosting inhibition on a bi-layer coating infused with propylene glycol with a 4 by 4 square pore array in the outer membrane according to some embodiments of the invention.
Figure 1C:
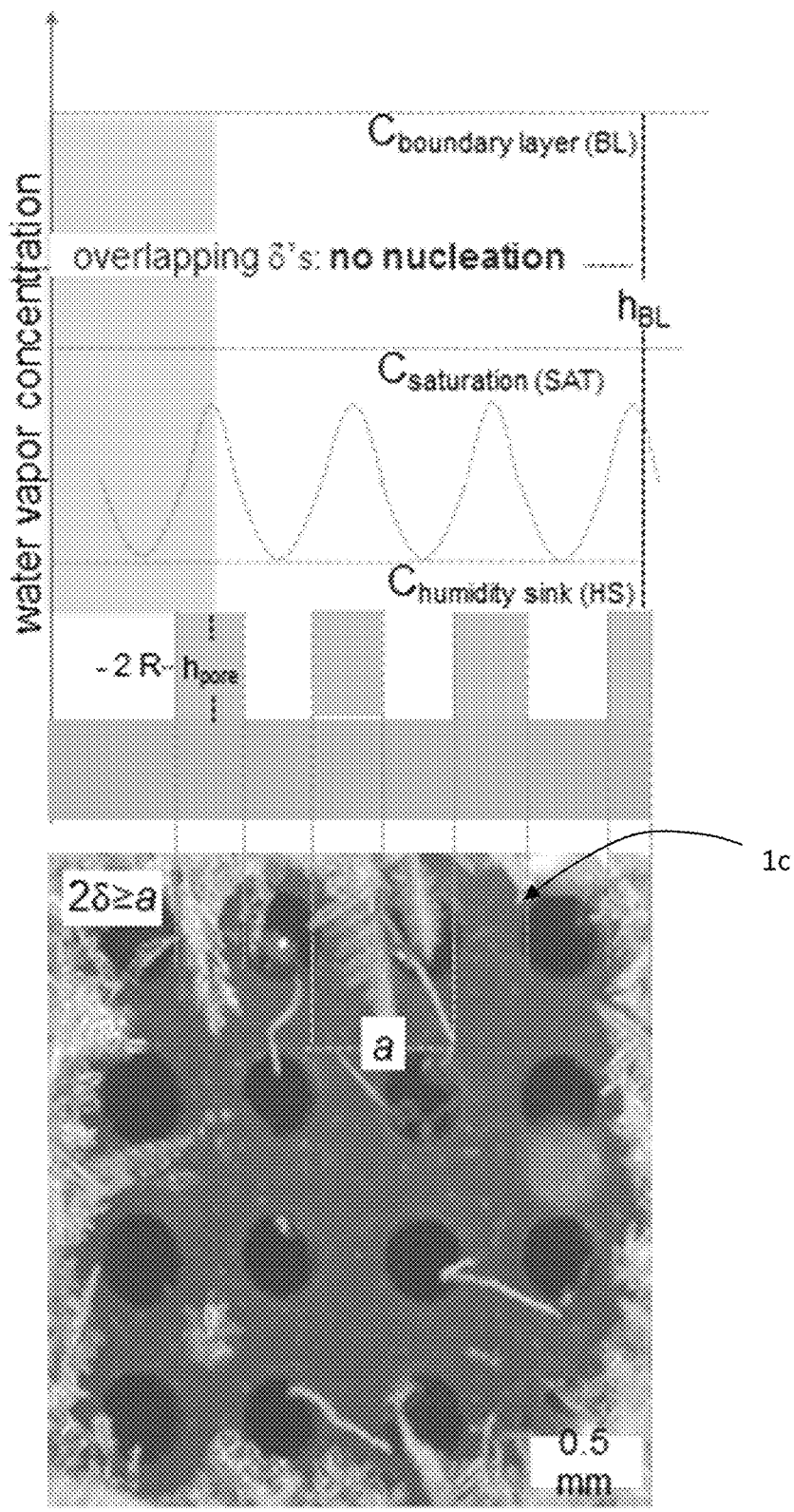

FIG. 1A shows an illustration of condensation frosting inhibition on a bi-layer coating infused with propylene glycol with (a) an individual pore with diameter of 500 μm according to some embodiments of the invention, and FIGS. 1B and 1C illustrate condensation frosting inhibition on a bi-layer coating infused with propylene glycol with a 4 by 4 square pore array in the outer membrane according to some embodiments of the invention. In FIG. 1B, the pores 1b have non-overlapping regions of inhibited condensation 2 (RICs) due to the pore spacing, (marked as "a"), being larger than the size of RIC (a≥2δ), while in FIG. 1C, the pores 1c have overlapping RIC (i.e. a≤2δ). In the latter case, condensation frosting is completely inhibited in-between the pores 1b due to the integral humidity sink effect. In all cases, the samples were cooled to 263 K for 30 minutes while surrounded by air at temperature of 298 K with 100% relative humidity. Analogously to a drop of hygroscopic liquid on a surface, the image in FIG. 1A shows that a pore 1a in a hydrophobic film filled by the liquid also creates a RIC in its vicinity. FIG. 1B and FIG. 1C clearly demonstrate that, as with arrays of hygroscopic drops, overlapping of the RIC of individual pores leads to inhibition of nucleation over the area occupied by the array. The dynamics of the humidity sink effect around isolated drops of hygroscopic liquid have been analyzed in depth, but with only qualitative agreement between theoretical predictions and experimental results. As in the areas surrounding hygroscopic drops, our results show regions of inhibited condensation and condensation frosting surrounding isolated pores with radii of ~80 μm to ~550 μm in membranes on top of the propylene glycol infused layer.

Figure 2A:
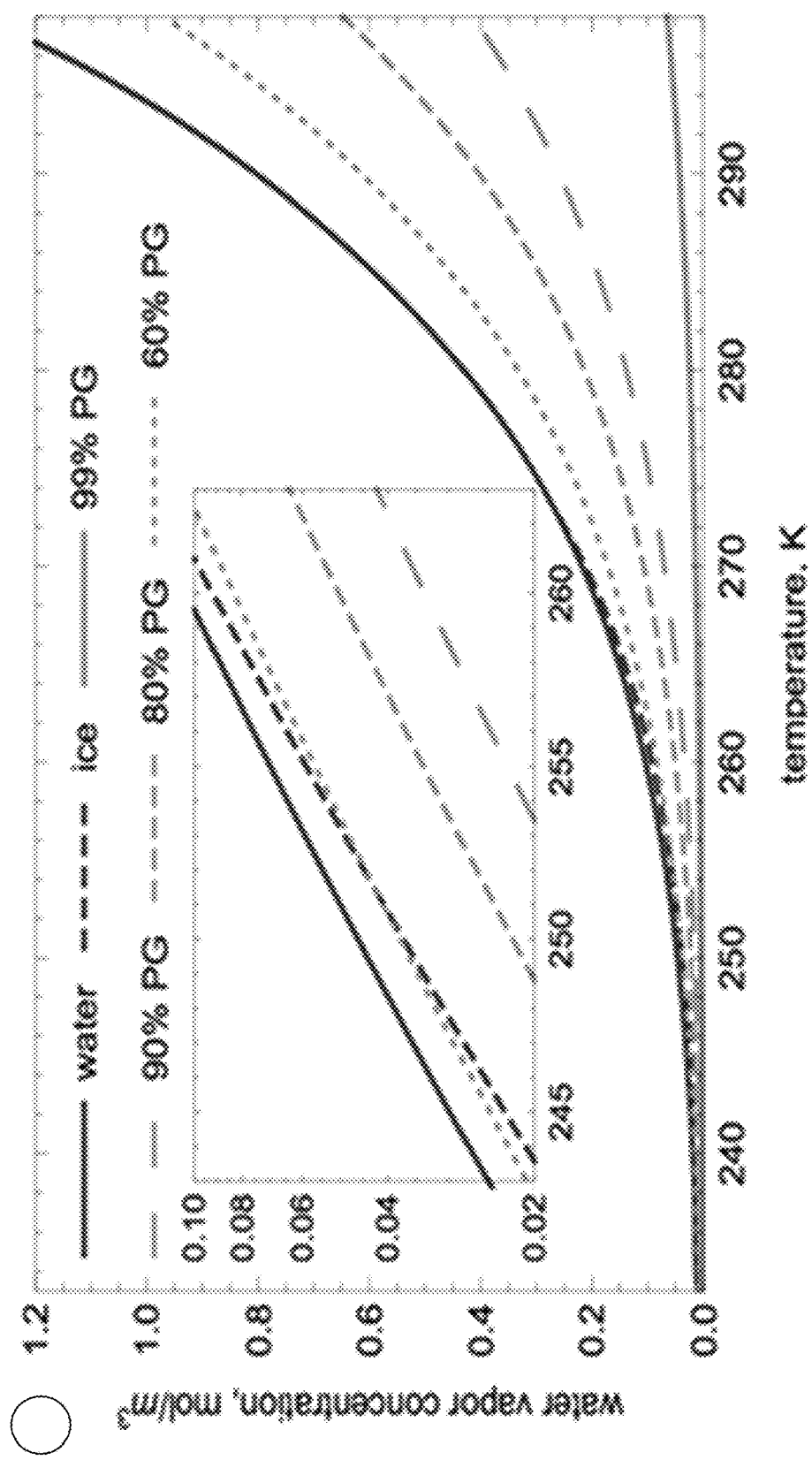
FIG. 2A shows a plot of the water vapor saturation concentration above the surface of water and ice, concentrations of propylene glycol, and water solutions (concentration specified by weight) as a function of temperature according to some embodiments of the invention.
Figure 2B:
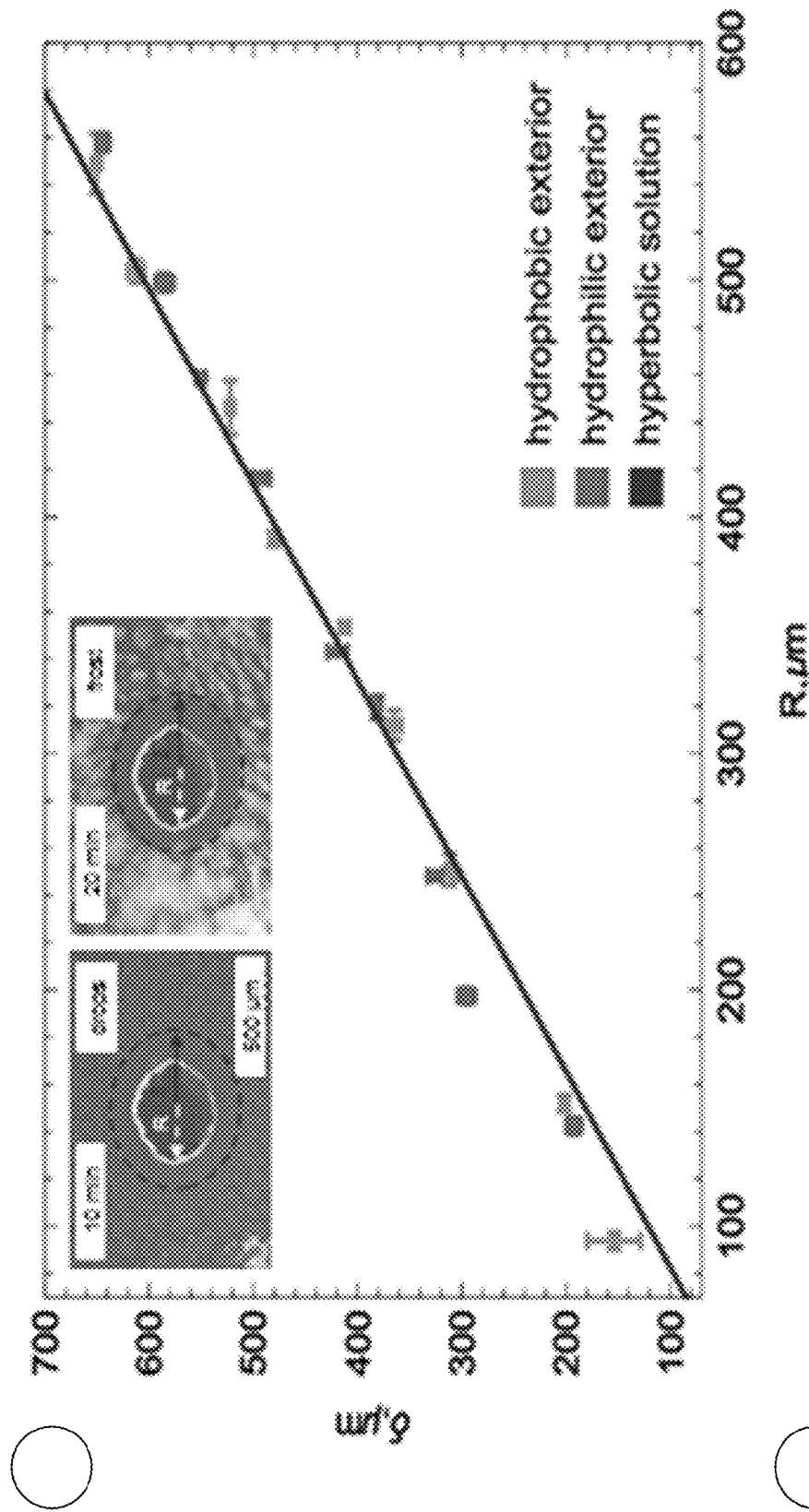
FIG. 2B shows a plot of the measured and theoretically predicted radius of the circular regions of inhibited condensation and condensation frosting (circular RIC with radius δ) around isolated pores with radius R in membranes with hydrophobic and hydrophilic exterior surface cooled to 267±2 K with source temperature of 293±1 K according to some embodiments of the invention.
Figure 2C:
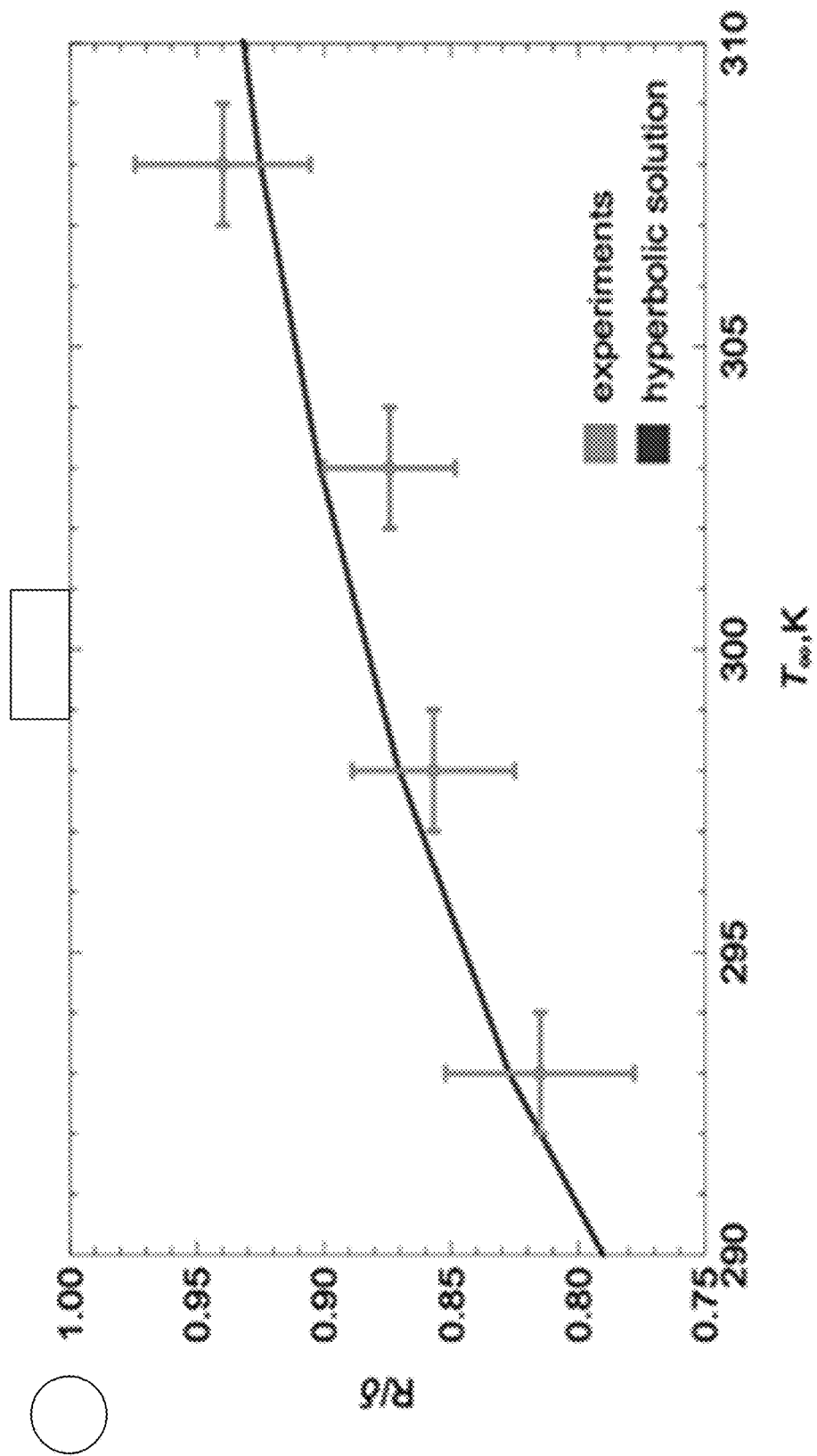
FIG. 2C shows a plot of the measured and theoretically predicted ratio for different vapor source temperatures with fixed sample temperature of 267±2 K according to some embodiments of the invention.

FIG. 2A shows a plot of the water vapor saturation concentration above the surface of water and ice, concentrations of propylene glycol, and water solutions (concentration specified by weight) as a function of temperature according to some embodiments of the invention. FIG. 2B shows a plot of the measured and theoretically predicted radius of the circular regions of inhibited condensation and condensation frosting (circular RIC with radius δ) around isolated pores with radius R in membranes with hydrophobic and hydrophilic exterior surface cooled to 267±2 K with source temperature of 293±1 K according to some embodiments of the invention, and FIG. 2C shows a plot of the measured and theoretically predicted ratio for different vapor source temperatures with fixed sample temperature of 267±2 K according to some embodiments of the invention.

The plot in FIG. 2A shows that this common, non-toxic, antifreeze is also an excellent desiccant, suppressing water vapor pressure over a wide range of concentrations. The images shown in the plot of FIG. 2B show that the size of RIC induced by the propylene glycol filled pore remains nearly unchanged as the condensed water droplets freeze and transition into frost. This condition is important as it facilitates the analysis of the humidity sink effect around pores as compared to drops, whose radii change during frosting experiments (as does the size of the surrounding RIC). Furthermore, it was determined that the size of the RIC is the same around pores on membranes with hydrophobic Polytetrafluoroethylene (PTFE) and highly hydrophilic gold exterior. Since the water contact angle on these two surfaces is dramatically different, approximately 100° and less than 10° respectively, it can be seen from Equation 2 that the energetic barrier to nucleation in the RIC is dominated by the contribution from the water vapor concentration at the surface, not the contribution of the surface's wetting properties (albeit the PTFE membranes do have a surface roughness on the order of 50 nm, which can encourage nucleation). Consequently, the size of the RIC, δ, should be dictated by the surrounding water vapor concentration.

For an isolated and slowly growing droplet of hygroscopic liquid with radius R, surrounded by a stagnant isothermal semi-infinite medium, the quasi-steady state water vapor concentration profile in spherical coordinates, $C(r)$, is hyperbolic. Specifically, $C(r)=C_\infty+(C_{HS}-C_\infty)R/r$, from which it follows that the size of the RIC where $C(r)<C_{SAT}$ is $\delta=R(C_{HS}-C_\infty)/(C_{SAT}-C_\infty)$ (where $C_{HS}$ and $C_\infty$ are the water vapor concentrations at the humidity sink surface and at infinity, in practice taken as the boundary layer thickness $h_{BL}$). This relation has been used to develop scaling laws for the evolution of the R/δ ratio and droplet growth, which qualitatively agree with experiments. Despite the difference in pore and drop geometry, the plot in FIG. 2B shows that the analytical expression for the relation between δ and R derived from the hyperbolic concentration profile agrees well with our experimental measurements. The quantitative agreement between modeling and experimental results is enabled by use of a custom environmental chamber. In contrast to previous studies that were conducted in the presence of natural convection or forced flow, the boundary conditions in our setup can be accurately represented in the theoretical formulation. Further, the hyperbolic water vapor concentration profile is applicable only prior to formation of the RIC. The boundary condition on the surface outside the RIC changes from no flux to constant water or ice saturation concentration once these phases nucleate. However, because the concentration set by the propylene glycol is still significantly smaller than the saturation concentration of ice or supercooled water, the radial concentration profile within the RIC remains nearly unchanged after nucleation outside of this region.

An important consequence of the near hyperbolic vapor concentration field around the pores is that the initial ratio of R/δ is a non-dimensional constant equal to $(C_{SAT}-C_\infty)/(C_{HS}-C_\infty)$ for fixed environmental conditions. Confirming this relation, the experimental value of R/δ=0.82±0.05, obtained from the slope of the line in FIG. 2B matches closely the theoretically predicted value of 0.83. Furthermore, the plot in FIG. 2C shows agreement between experimental and theoretical values of R/δ for varied water source concentrations (achieved by changing the temperature of the water saturated cotton fabric, $T_\infty$, on the top boundary, which increases the saturation pressure leading to increase in $C_\infty=P_\infty/\overline{R}T_\infty$). As the source concentration increases, the R/δ ratio approaches unity, implying that a RIC ceases to exist. In turn, as the source concentration decreases, R/δ ratio decreases and eventually, as $C_\infty \to C_{SAT}$, vanishes (i.e. lack of a concentration gradient prevents mass transfer that feeds nucleation). From an applied perspective, this spatial trend is beneficial as a large RIC would ensure inhibition of condensation frosting while an aircraft is ascending (assuming the rapid cooling of the wing exterior leads to $C_\infty \sim C_{SAT}$). Reasonable values of R/δ from 0.91 to 0.77 should also exist during aircraft descent in the majority of environmental conditions.

Naturally, the size of the RIC will decrease as the antifreeze solution becomes diluted (i.e. R/δ→1 as $C_{HS} \to C_{SAT}$). However, a decrease of the RIC during any of the single pore experiments was not observed, and after about 30 minutes, the frost nucleated outside the RIC starts to spread in three dimensions and partially fills the space above the pore, making quantification of the δ impossible). This effect could be caused by the presence of another humidity sink posed by the ice itself or a reservoir of propylene glycol under the individual pore. Consequently, it is unclear if the trends observed for isolated pores are preserved when the water vapor and reservoir concentration fields are altered by presences of multiple pores arranged in periodic geometrical arrays.

The extent of the humidity sink effect around an isolated pore filled with propylene glycol can be quantitatively predicted from the hyperbolic, quasi-steady state water vapor concentration profile. Based on this result, the integral humidity sink effect, stemming from a periodic array of pores, can be analyzed by evaluating the three-dimensional concentration field, C(t, x, y, z), above a single array "unit cell" with periodic boundary conditions with adjacent unit cells (i.e. no flux condition, see schematics in FIG. 3A). The source of the water vapor is provided by a constant concentration on the top plane, $C_{BL}$, that corresponds to the edge of the boundary layer that is located at a height $h_{BL}$ above the membrane plane (z=0). For simplicity, pore depth is neglected, and analysis is performed on a square pore with side length b centrally located within a square unit cell with side length a (also equal to inter-pore distance). On the plane of the membrane, mass transfer in the normal direction occurs only into the pore due to a water vapor concentration $C_{HS}$ that is lower than the $C_{BL}$ (i.e. $dC/dz_{z=0}=0$ outside the pore). While the $C_{HS}$ will change due to dilution of the antifreeze with water (see FIG. 2A), for this analysis it can be assumed to be constant because the dilution time scale observed during the isolated pore experiments was significantly longer than the vapor diffusion time scale $t_d=h_{BL}^2/D_w\sim1$ s (where $D_w$ is the water vapor diffusion coefficient in air equal to $\sim 0.25\times10^{-4}$ m$^2$s$^{-1}$ near room temperature). In the quasi-steady state, the governing equation reduces to ΔC(x, y, z)=0, making our problem formulation mathematically equivalent to one of the common cases of heat spreading resistance problems.

Figure 3A:
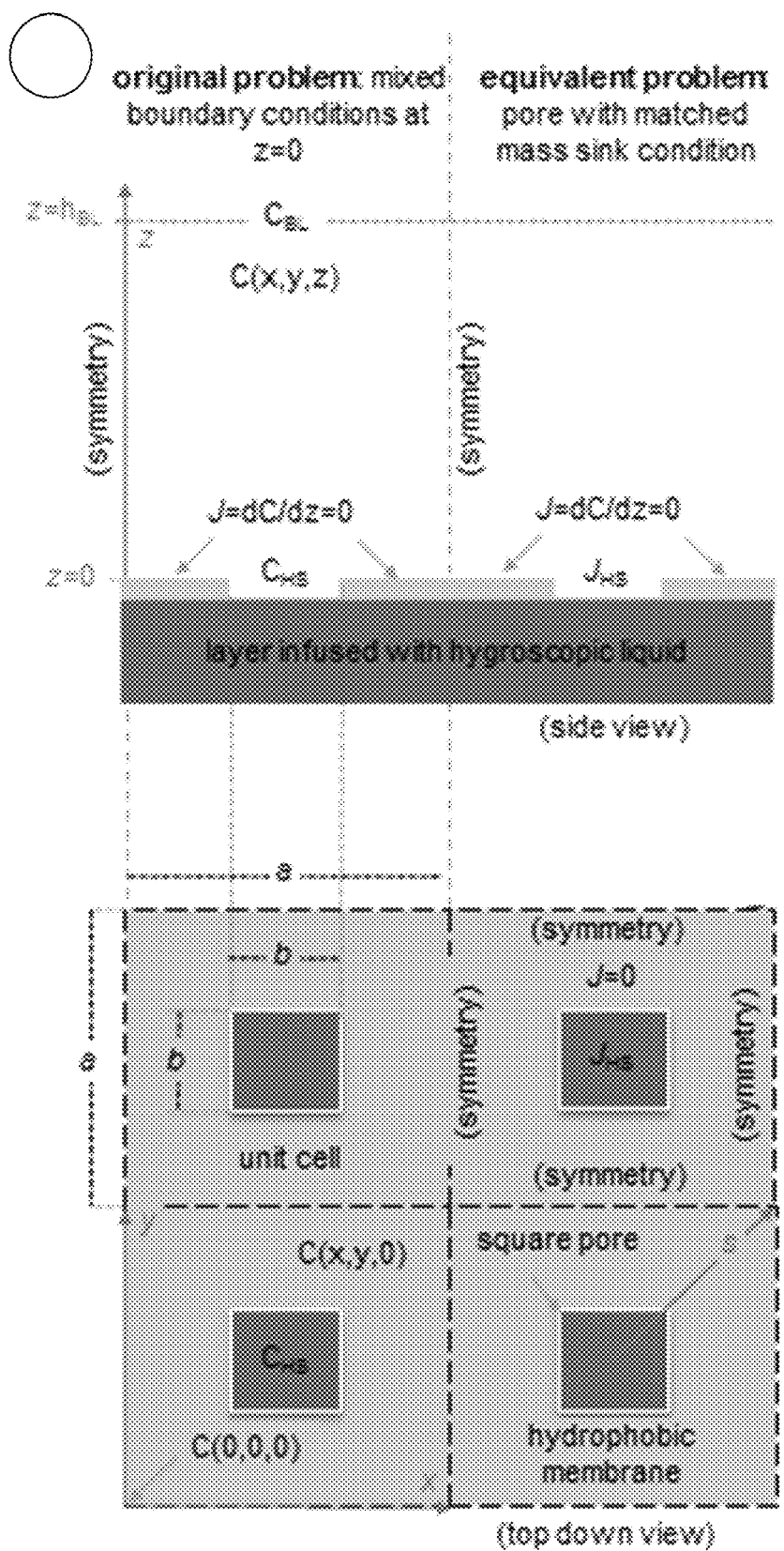
FIG. 3A shows a schematic representation of the mathematical formulation of the integral humidity sink effect posed by array of square pores in accordance with some embodiments of the invention.
Figure 3B:
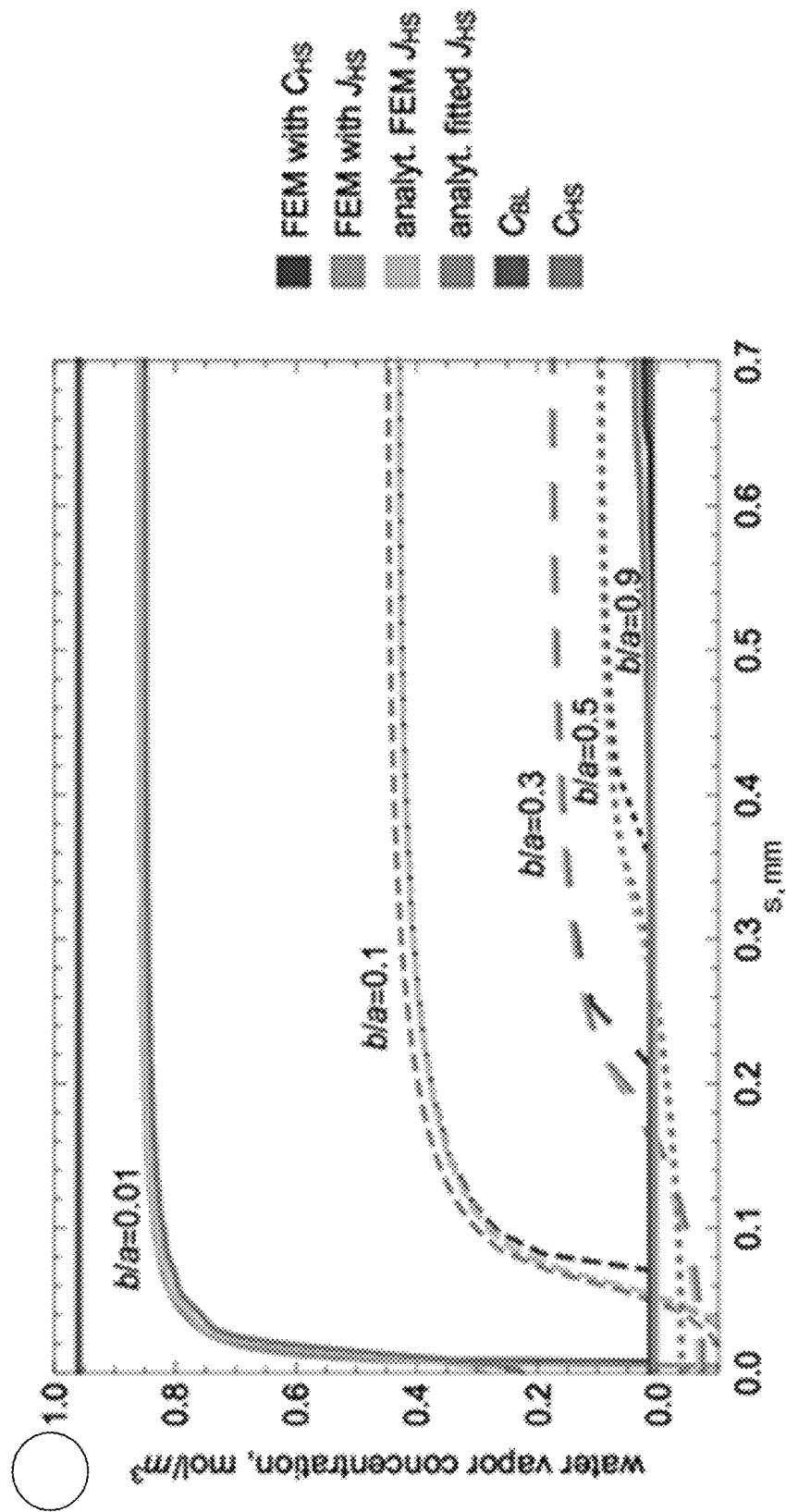
FIG. 3B shows a plot of concentration profiles along the unit cell diagonal for the two problem formulations simulated using FEM and calculated using Muzyczka et al. analytical solution with directly substituted from FEM simulations as well as calculated using the proposed empirical formula in accordance with some embodiments of the invention.
Figure 3C:
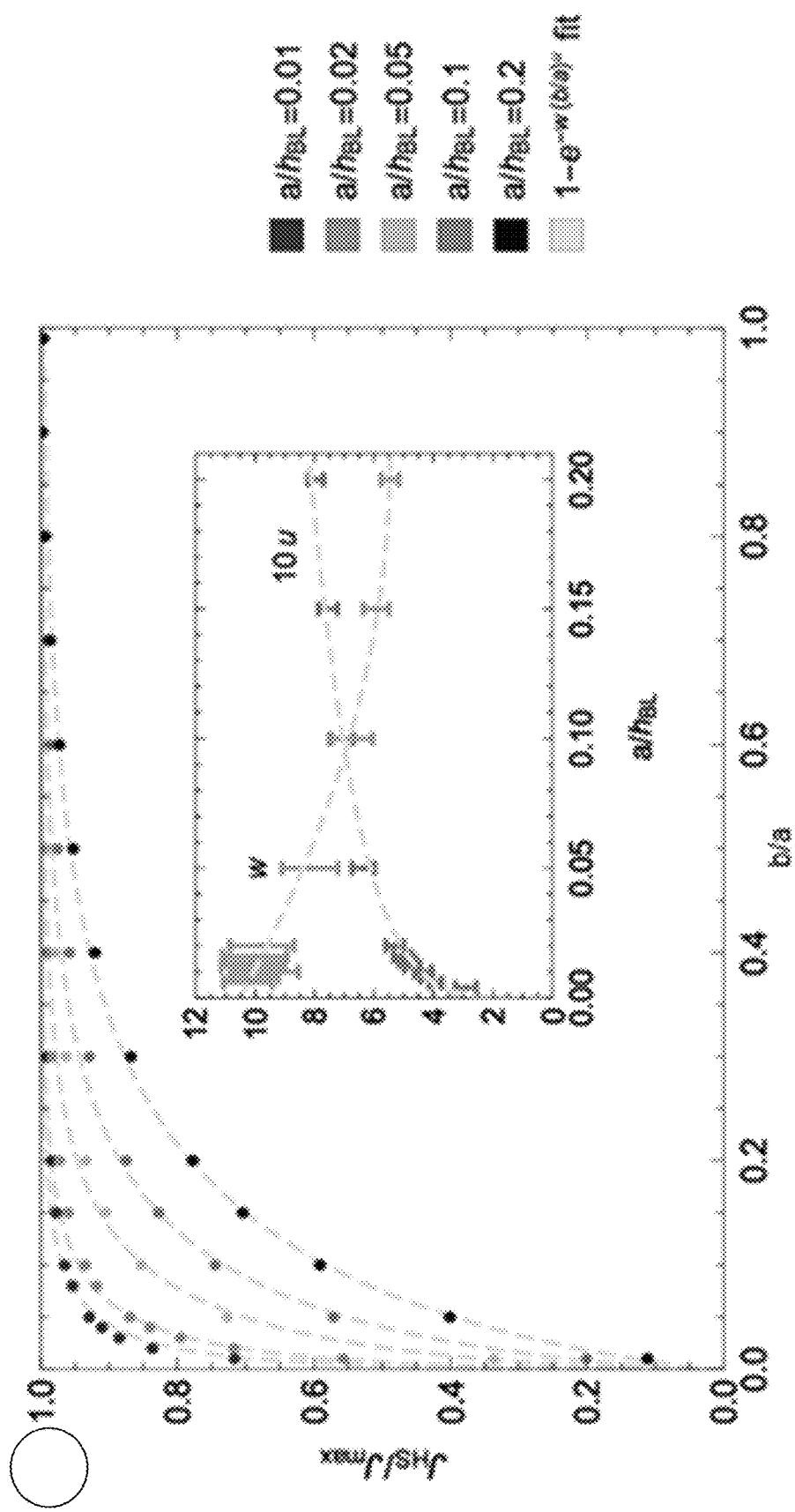
FIG. 3C shows a plot of the normalized mass sink, and proposed empirical fits as a function of non-dimensional pore size for various pore to boundary layer thickness ratio in accordance with some embodiments of the invention.

FIG. 3A shows a schematic representation of the mathematical formulation of the integral humidity sink effect posed by array of square pores with uniform concentration $C_{HS}$ at the pore surface as well as a re-formulated version of the problem proposed by Muzyczka et al with an equivalent mass sink $J_{HS}$ in accordance with some embodiments of the invention (see Muzychka, Y. S.; Culham, J. R.; Yovanovich, M. M. Thermal Spreading Resistance of Eccentric Heat Sources on Rectangular Flux Channels. J. Electron. Packag. 2003, 125, 178-185). FIG. 3B shows a plot of concentration profiles along the unit cell diagonal for the two problem formulations simulated using FEM and calculated using Muzyczka et al. analytical solution with directly substituted from FEM simulations as well as calculated using the proposed empirical formula in accordance with some embodiments of the invention. Further, FIG. 3C shows a plot of the normalized mass sink, and proposed empirical fits as a function of non-dimensional pore size for various pore to boundary layer thickness ratio in accordance with some embodiments of the invention.

Muzyczka et al. showed that the mathematical difficulties posed by the mixed Dirichlet and Neumann boundary conditions at the membrane surface can be handled by assuming a constant mass sink, $J_{HS}$ (units of mol/s), at the pore surface that is equivalent to the mass sink driven by the constant pore surface concentration $C_{HS}$ (see the schematics of the two cases in FIG. 3A). However, a general closed-form formula for $J_{HS}$ was not provided. To resolve this issue, Finite Element Method (FEM) is used to simulate the problem and the fitted results used to obtain an empirical formula for $J_{HS}$ as a function of the geometrical parameters and the top and the sink water vapor concentrations.

The plots in FIG. 3B show a close match between concentration profiles along the membrane diagonal, s, for the mixed and equivalent mass sink boundary condition cases simulated using FEM for wide range of b/a values (with a=1 mm, $h_{BL}$=5 mm, $C_{BL}$(293 K)=0.9596 mol/m$^3$, and $C_{HS}$(268 K)=0.0113 mol/m$^3$). The values of $J_{HS}$ were obtained from the mixed boundary case and manually substituted into the equivalent mass sink FEM simulation. As expected, when the same $J_{HS}$ values were substituted, comparable FEM and analytical results were obtained (compare the "FEM $C_{HS}$", the "FEM $J_{HS}$" and the "analyt. FEM $J_{HS}$" curves). With the assumptions of $h_{BL} \gg a$ and infinite convective mass transfer coefficient at the source (to reduce to constant source concentration. Muzyczka et al. solution reduces to:

$$C(x, y, 0) = \quad (3)$$

$$C_{BL} + J_{HS}\frac{h_{BL}}{a^2 D_w}\left(1 + 4\frac{a}{b}\frac{a}{h_{BL}}\sum_{m=1}^{\infty}\frac{\cos\left(\frac{xm\pi}{a}\right)\cos\left(\frac{m\pi}{2}\right)\sin\left(\frac{m\pi b}{2a}\right)}{\pi^2 m^2} + \right.$$

$$4\frac{a}{b}\frac{a}{h_{BL}}\sum_{n=1}^{\infty}\frac{\cos\left(\frac{yn\pi}{a}\right)\cos\left(\frac{n\pi}{2}\right)\sin\left(\frac{n\pi b}{2a}\right)}{\pi^2 n^2} +$$

$$\left. 16\left(\frac{a}{b}\right)^2\frac{a}{h_{BL}}\sum_{n=1}^{\infty}\sum_{m=1}^{\infty}\frac{\cos\left(\frac{xm\pi}{a}\right)\cos\left(\frac{yn\pi}{a}\right)\cos\left(\frac{m\pi}{2}\right)\sin\left(\frac{m\pi b}{2a}\right)\cos\left(\frac{n\pi}{2}\right)\sin\left(\frac{n\pi b}{2a}\right)}{\pi^3 mn\sqrt{n^2 + m^2}}\right)$$

Again, for Equation 3 to have predictive power, a formula for $J_{HS}$ as a function of the geometrical parameters and the top and the sink water vapor concentrations is needed. From Fick's law it is known that the maximal value of the $J_{HS}$ will be $$J_{max} = D_W(C_{HS} - C_{BL})\frac{a^2}{h_{BL}}$$

when b→a (i.e. complete film of antifreeze). The plot in FIG. 3C shows that when normalized by this maximum value, the mass sink values obtained from FEM simulations follow a common trend with the b/a ratio that is well represented by the functional form $$1 - e^{-w\left(\frac{b}{a}\right)^u}.$$

In agreement with physics of the problem, this relation decays to 0 when b/a→0 (i.e. no mass sink when there is no pore). The inset in FIG. 3C shows that the two parameters w and u are a function of the $a/h_{BL}$ ratio and can be respectively fitted with a second order polynomial and a power function. Specifically, it is found that the relationships $u=1.13(a/h_{BL})^{0.2}$ and $w=10.52-48.57(a/h_{BL})+116.64(a/h_{BL})^2$ provide excellent fits to the simulation data (see Support Information for further details about the fits). Consequently, the following empirical formula can be used for the equivalent mass sink:

$$\frac{J_{HS}\left(\frac{b}{a}, \frac{a}{h_{BL}}\right)}{D_W(C_{HS} - C_{BL})\frac{a^2}{h_{BL}}} = \left(1 - e^{-\left(10.52-48.57\left(\frac{a}{h_{BL}}\right)+116.64\left(\frac{a}{h_{BL}}\right)^2\right)\left(\frac{b}{a}\right)^{1.13(a/h_{BL})^{0.2}}}\right) \quad (4)$$

Corroborating this relation, the plot in FIG. 3B shows good agreement between the FEM simulation results and the concentration profiles using the empirical mass sink expression (the "analyt. fitted $J_{HS}$" curves).

Nucleation on the exterior surface of the membrane will not proceed unless the maximum vapor concentration at the membrane surface is equal to or lower than $C_{SAT}$ corresponding to the membrane's surface temperature. From the symmetry of the problem formulation, it is known that the highest concentration on the membrane surface will occur at the corners of the unit cell such as point (x,y,z)=(0,0,0) in FIG. 3A. With substitution of Equation 4, Muzychka's general solution can be reduced to the following expression for the excess concentration at the corner of the unit cell, $\theta(0,0,0)=C(0,0,0)-C_{BL}$:

$$\frac{\theta(0,0,0)}{\theta_{HS}} = \frac{C(0,0,0) - C_{BL}}{C_{HS} - C_{BL}} = \quad (5)$$

$$\Omega_0\left(\frac{b}{a}, \frac{a}{h_{BL}}\right) = \frac{J_{HS}\left(\frac{b}{a}, \frac{a}{h_{BL}}\right)}{J_{max}}\left(1 + 8\frac{a}{h_{BL}}\Omega_1\left(\frac{b}{a}\right)\right)$$

Where $$\Omega_1\left(\frac{b}{a}\right) = \quad (6)$$

$$\frac{a}{b}\sum_{n=1}^{\infty}\frac{\cos\left(\frac{m\pi}{2}\right)\sin\left(\frac{m\pi b}{2a}\right)}{\pi^2 m^2} + 2\left(\frac{a}{b}\right)^2\sum_{n=1}^{\infty}\sum_{m=1}^{\infty}\frac{\cos\left(\frac{m\pi}{2}\right)\sin\left(\frac{m\pi b}{2a}\right)\cos\left(\frac{n\pi}{2}\right)\sin\left(\frac{n\pi b}{2a}\right)}{\pi^3 mn\sqrt{n^2 + m^2}}$$

Importantly, Equations 4 through 6 are only functions of the non-dimensional geometrical ratios of the unit cell size to the boundary layer thickness ($a/h_{BL}$) and the pore size to the unit cell size (b/a, which is referred to as the non-dimensional pore size). The absolute value of the $\Omega_1$ function is at most 0.03. Consequently, as the unit cell size decreases to nanoscale (i.e. with $h_{BL}$ of a few millimeters, $a/h_{BL}\to 0$), Equation 5 reduces to the normalized mass sink $$\left(\text{i.e. } \theta(0,0,0)/\theta_{HS} \to J_{HS}\left(\frac{b}{a}, \frac{a}{h_{BL}}\right)/J_{max}\right).$$

Furthermore, as $a/h_{BL}\to 0$, w→10.52 and u→0 leading to $$J_{HS}\left(\frac{b}{a}, \frac{a}{h_{BL}}\right)/J_{max} \to 1 - e^{-10} \to 1,$$

implying that $\theta(0,0,0)\to\theta_{HS}$ and $C(0,0,0)\to C_{HS}$. In other words, the maximum concentration on the membrane surface will be equal to the concentration set by the propylene glycol liquid within the pore. Remarkably, this means that as the length scale of the pore array decreases to nanoscale the vapor concentration will be uniform and equal to the humidity sink concentration. Additionally, when the exponential term in Equation 4 decays to zero, this effect will be completely independent of the non-dimensional pore size (b/a). The threshold for this condition can be assumed to occur when the exponential term is smaller than 0.01 (i.e. at least $e^{-4.5}$), which leads to the following expression for the critical value of the non-dimensional pore size above which concentration on the surface will be uniform:

$$\left(\frac{b}{a}\right)_{critical} \geq \left(\frac{4.5}{105.2 - 48.57\frac{a}{h_{BL}} + 116.6\left(\frac{a}{h_{BL}}\right)^2}\right)^{0.89\left(\frac{a}{h_{BL}}\right)^{0.2}} \quad (8)$$

The dependence only on temperature of the excess concentration ratio (left hand side of Equation 5) and of the $\Omega_0$ function solely on two geometrical ratios b/a and $h_{BL}/a$ (right hand side of Equation 5) provides a path for experimental validation of the theory developed in the previous section. Specifically, by comparing experimental values of nucleation onset surface temperature, $T_{NOST}$, on various periodic pore array geometries to ones determined theoretically through equating of the $$\frac{C_{sat}(T_{NOST}) - C_{BL}(T_{BL})}{C_{HS}(T_{NOST}) - C_{BL}(T_{BL})}$$

ratio with $$\Omega_0\left(\frac{b}{a}, \frac{a}{h_{BL}}\right)$$

for utilized geometry, the theory can be validated.

FIG. 4A shows a plot of $\Omega_0$ as a function of non-dimensional pore size, b/a, for various ratios of the array unit cell size to boundary layer thickness, $a/h_{BL}$, where the inset shows variation of the excess saturation to pore surface concentration ratio, $$\frac{C_{sat}(T_{surface}) - C_{BL}(T_{BL})}{C_{HS}(T_{surface}) - C_{BL}(T_{BL})},$$

as a function of surface temperature, $T_{surface}$, for fixed boundary layer temperature of $T_{BL}$=298 K. Further, FIG. 4B shows a plot of theoretically predicted (colored areas) and experimentally measured (for given a the experimental points have the same but darker tone color as the colored area) nucleation onset surface temperature, $T_{NOST}$, as a function of b/a for various $a/h_{BL}$ ratios (to account for possible dilution effects, predictions for propylene glycol concentrations between 75% and 99% are plotted for each unit cell size; also to take into account size distribution nanoporous samples, the upper bound in this case corresponds to a of 1500 nm with 75% PG). Further, FIG. 4C shows example images of the porous membranes used in the experiments with unit cell size, a, of 1 mm (laser etched PTFE membranes), 250 μm (PDMS coated steel mesh), and ~500 nm (for the polycarbonate membranes an equivalent cell size was found through image analysis).

The plots in FIG. 4A show these two functions while those in FIG. 4B show $T_{NOST}$ values predicted by equating them for different pore array configurations. The $T_{NOST}$ range is strongly dependent on both the b/a and $a/h_{BL}$ ratios, with a sharp decrease predicted with a decrease of the unit cell size (with fixed $h_{BL}$=5 mm). This trend is a manifestation of the decay of the maximum vapor concentration at the membrane surface towards the value set by the propylene glycol within the pore as predicted in the previous section. Specifically, while the plot in FIG. 2A shows that the concentration set by nearly pure propylene glycol (e.g. 99% by weight) is always lower than saturation concentration of supercooled water and ice, the differences between these values becomes negligible (below 0.01 mol/m³) as the temperature decreases below 250 K. This implies that for nanoscale pore arrays with the b/a larger than the critical value resting on a nearly pure propylene glycol infused layer, nucleation of ice or droplets on the membrane exterior will be inhibited until the substrate is cooled to below ~250 K. Naturally, the duration of this effect will depend on the liquid dilution rate, which will increase $C_{HS}$ and with that concentration above the entire surface.

In order to experimentally validate the proposed theory, the nucleation onset surface temperature on samples was measured with the unit cell size ranging over three orders of magnitude from ~500 nm to 1 mm. The images in FIG. 4C show images of laser etched PTFE thin film membranes with spacing, a, of 1 mm (top row images), PDMS coated metal meshes with spacing of a=125 μm and of 250 μm (middle row images), and of commercial polycarbonate membranes with an average equivalent a of ~400 to 600 nm (overall average of ~500 nm) (bottom row images). For the latter samples that have randomly distributed pores, equivalent parameters for a square pore array through statistical analysis of surface electron micrographs can be defined. As in the isolated pore experiments, PTFE and PDMS samples with native hydrophobic properties as well as with highly hydrophilic gold thin film coating were tested. Since the gold film needs to be about 10 nm thick in order to ensure continuity, it could affect the size of the nanopores that have diameters down to 10 nm and thus was not utilized with the polycarbonate membranes.

Since the onset nucleation surface temperature is dependent on the concentration of propylene glycol in the pores, it is critical to perform the experiments without substantial dilution of the antifreeze. Another concern when using propylene glycol is that it can store a substantial content of water that is rejected from the liquid when it is cooled from room temperature (see plot in FIG. 2A). In order to avoid artifacts caused by this water vapor rejection process (i.e. humidity sink temporarily becoming a humidity source), the entire sample was pre-cooled at 268 K with a "dry" source at the top of the chamber and continuous purging of the chamber with flow of dry nitrogen gas for a period of 15 minutes (the time was iteratively determined to be sufficient to remove the excess moisture). Subsequently, the surface temperature of the sample was changed to the desired starting temperature and, immediately, the wick on top of the chamber was infused with water. The temperature of the vapor source at the top of the chamber was maintained using a transparent heater at 298 K for all experiments, which provided an environment with nearly 100% relative humidity (at 298 K). To determine the $T_{NOST}$, temperature of the sample was decreased at a ramping rate of 0.1 K/s until formation of water droplets was observed. Each experiment was repeated with the starting membrane temperature adjusted closer to the $T_{NOST}$ value measured during the previous iteration. The process was iterated until the value of measured $T_{NOST}$ was independent of the starting temperature.

The measured nucleation onset surface temperatures follow the general theoretically predicted trends. Specifically, the plot in FIG. 4B shows that $T_{NOST}$ decreases dramatically as the order of magnitude of the unit size is decreased. For example, at a fixed ratio, b/a~0.3, $T_{NOST}$ decreased from ~275 K at a=1 mm to ~255 K for a=125 to 250 μm and, remarkably, to ~230 K for a~500 nm. To reiterate, for same area fraction ($b^2/a^2$) of the exposed propylene glycol, the temperature for onset of nucleation can be decreased by 40 K simply by decreasing the size of the pores from millimeters to a nanometers (to a total decrease of 65 K from the dew point of 298 K in the chamber). Similarly, for b/a greater than 0.3, about a 20 K drop in $T_{NOST}$ can be measured when the unit cell size was decreased by an order of magnitude from 1 mm to 125 to 250 μm (the $T_{NOST}$ values for hydrophilic and hydrophobic exteriors matched closely. In all cases, the dramatic effects of the unit cell size and the non-dimensional pore size are quantitatively predicted by the developed model, which validates the proposed theory of the integral humidity sink effect. The most pronounced discrepancy between experimental and theoretical results is an offset of the experimental data by ~5 K for the nanoporous samples. This effect likely stems from the significant departure of the geometry of the randomly distributed nanopores from the idealized square grid pore array that can be modeled. Furthermore, vapor transport within the nanopores is likely slowed down from increased boundary scattering. Due to this non-continuum effect, the measured $T_{NOST}$ for the nanoporous samples is expected to be higher than predicted theoretically (i.e. experiments are a more conservative estimate of the temperature, see further discussion in Support Information).

The nucleation onset surface temperature measurements can also be used to validate the formula developed for the critical value of the non-dimensional pore size needed for reaching a uniform surface vapor concentration for different unit cell sizes (i.e. Equation 8). Specifically, this condition can be assumed to occur when $$\frac{C_{sat}(T_{NOST}) - C_{BL}(T_{BL})}{C_{HS}(T_{NOST}) - C_{BL}(T_{BL})} \geq 0.99.$$

Based on the inset in the plot of FIG. 4A (with $T_{BL}=298$ K), this condition occurs at around 240 K and 250 K for propylene glycol concentrations of 99% and 75%, respectively (where ther concentration range can be broadened to take into account possible antifreeze dilution). In other words, it can be assumed that the surface concentration gradient vanishes when the measured $T_{NOST}$ is in this range. Based on the experimental data, this condition occurs for the nanoporous (average a was in the range of 400 to 600 nm) and microporous (a=125 to 250 μm) samples when b/a is larger than ~0.05 and ~0.45, respectively. Using Equation 8, the corresponding values of the critical b/a of 0.01 to 0.02 and 0.3 to 0.4 are obtained with $h_{BL}=5$ mm. For the largest pores with a=1 mm Equation 8 predicts a critical b/a of 0.8, however, the corresponding experimental $T_{NOST}$ is ~260 K, which is well above the threshold value of ~250 K. This discrepancy can be explained by the fact that Equation 8 was derived under the assumption of $a/h_{BL} \rightarrow 0$, while for the large pores $a/h_{BL}=0.2$. Consequently in this case using the full model results in FIG. 4B provides a better estimate of the critical b/a of ~0.95. This value of the non-dimensional pore size corresponds to a nearly open propylene glycol film and is beyond the capabilities of the PTFE membrane laser etching method (thus cannot be observed).

In the previous section, it was demonstrated that due to a vanishing ratio of the unit cell size to the boundary layer thickness, the nanoporous bi-layer antifreeze-infused coatings can provide a about a 65 K depression in the surface temperature required for onset of nucleation. Furthermore, at the surface of the nanoporous membranes the water vapor concentration is uniform and equal to the concentration set by the propylene glycol within the pores. This effect provides a strong advantage over membranes with larger pores on which saturation concentration can be reached more easily in-between the pores. Consequently, the coatings with a nanoporous exterior are likely optimal for anti-frosting applications. However, besides lowering of the immediate nucleation onset point described in previous section, the primary function of anti-frosting coatings is providing a substantial delay in onset and complete frosting over of the surface.

To quantify the times required for onset of condensation, frost formation, and complete icing over of the samples, extended frosting experiments were conducted on the nanoporous sample set cooled to 263 K, 253 K, and 243 K in a water vapor saturated environment at 298 K. The plots in FIGS. 5A-5C show that condensation as well as frost onset times increased with the non-dimensional pore size. Up to 120 minutes passed before first droplets appeared on the nanoporous membranes with b/a≥0.2 (corresponding to 100 nm and higher pore diameters) cooled to 263 K. Subsequently, the condensed droplets began to freeze uniformly over the entire surface within 10 to 30 minutes, with ice covering the entire surface shortly after (5 to 10 minutes). To provide perspective, on a "control solid" superhydrophobic coating in the same conditions, droplets appeared and froze after 1 minute and 5 minutes of cooling, respectively. The bi-layer coatings with nanoporous membranes with the smallest pores with b/a of 0.025 to 0.07 (corresponding to 10 nm and 30 nm pore diameter) did not provide any improvement in condensation delay over the superhydrophobic surface, while slightly increasing the pore size to b/a of 0.12 (corresponding to 50 nm pore diameter) delayed condensate formation by about 35 minutes. The frosting of the surfaces with b/a<0.1 proceeded much slower (30 to 50 minutes) in the expected wave-like fashion initiated at the sample edges, not in the uniform manner throughout the entire sample observed for the pores with b/a>0.1. In a film of propylene glycol, cooled to 263 K, ice crystals begin to appear within 60 to 90 minutes. Consequently, the substantial delay between onset of condensation and freezing on the nanoporous membranes with b/a<0.1 cooled to 263 K occurs due to formation of a liquid bridges across the nanopores that release some of the antifreeze to the exterior (and suppresses ice nucleation in the condensed liquid). At 263 K, the liquid bridge likely forms through bottom up filling of the pores due to dilution of the propylene glycol via vapor diffusion. On the coatings with b/a≥0.2 it does not appear that liquid bridging of the pores occurred, thus condensation was followed by freezing within 10 to 30 minutes.

During experiments conducted with surface temperatures at 243 K and 253 K, the trend of increasing condensation onset time with pore size was preserved, but the spatial mode of surface frosting flipped. Specifically, on the bi-layer coatings with nanoporous membranes with b/a≤0.12 rapid condensation was followed by spatially uniform freezing. In contrast, on the nanoporous samples with b/a≥0.2 slower growth of ice dendrites initiated at the sample edges occurred. As the substrate temperature is decreased to 253 K and 243 K, the probability of nucleation on the exterior of the surfaces increases substantially (see Equations 1 and 2). Once droplets or frost do nucleate on the exterior and begin to grow vertically, they become the main sink for water vapor. This leads to the antifreeze never being "released" out of the relatively deep (~6 μm) nanopores during the 243 K and 253 K experiments. This effect explains the flip of the spatial freezing modes and also highlights the importance of the pore depth. Specifically, the current results indicate that, in reasonable agreement with prediction from the criterion specified by Equation 8, nanoporous bi-layer surfaces with non-dimensional pore size above ~0.1 to 0.2 provide optimal anti-frosting performance. However, to provide a truly optimize bi-layer anti-icing coating the exterior geometrical design (i.e. pore diameter and spacing) must be balanced with the pore depth to allow for the additional anti-icing functionality provided by antifreeze release via transient dilution. In addition, the role of the bi-layer coating design on the propagation of frost needs to be further elucidated. Specifically, non-uniform spacing of pores (or pores with varied sizes) could potentially be used to control frost growth through inhibition of the ice bridging process.

FIG. 5A shows plots quantifying the times required for condensation onset of the nanoporous bi-layer propylene glycol infused coatings cooled to 263 K, 253 K, and 243 K in water saturated environment at 298 K in accordance with some embodiments of the invention. FIG. 5B shows plots quantifying the times required for frost onset of the nanoporous bi-layer propylene glycol infused coatings cooled to 263 K, 253 K, and 243 K in water saturated environment at 298 K, and FIG. 5C shows plots quantifying the times required for complete icing over of the nanoporous bi-layer propylene glycol infused coatings cooled to 263 K, 253 K, and 243 K in water saturated environment at 298 K in accordance with some embodiments of the invention. The open circle, triangle, and square markers indicate separate experimental runs. The corresponding values measured for a solid superhydrophobic coating (SHS) are shown for reference.

In some embodiments of the invention, the nanoporous bi-layer surfaces can be coupled to a source of antifreeze. In some embodiments, the nanoporous bi-layer surfaces with structures as described and defined above in equation 8 can be coupled or integrated with other materials, surfaces, or structures that can function as a source or supply of antifreeze. In some embodiments, the nanoporous layer can comprise a nanoporous coating formed by selective modification of a wick layer through texturing the surface at the nanoscale regime. For example, in some embodiments, at least some fraction of a wick layer can be rendered at least partially frost-resistant by texturing the surface of the wick layer using the design guidelines described earlier (e.g., such as those defined by equation 8).

In some embodiments of the invention described herein, the surface or substrate formed by the methods described herein can be substantially continuous. In other embodiments, the surface formed by the methods described herein can be substantially discontinuous. For example, in some embodiments, using the methods of forming multifunctional condensation and frost inhibiting coatings, layers, and/or surfaces described herein, the treated surface or substrate can include surfaces that are anti-icing only, or can include surfaces that include regions that exhibit anti-icing properties, and regions that do not.

In some embodiments, an anti-icing surface can be achieved by modification of the architecture (i.e., the structure and morphology) of at least a portion of a surface or substrate. In some embodiments, this can be achieved by selective modification of the surface through texturing the surface. In some embodiments, the surface texturing can comprise modification of a surface to form a texture comprising substantially uniform or non-uniform regions with micron, sub-micron, and/or nanoscale dimensions. In some embodiments, the surface texturing can be formed by physical modification (e.g., mechanical abrasion, deformation, or roughening). In some further embodiments, an anti-icing surface can be achieved by chemical modification. In some embodiments, the chemical modification can include the use of spatially confined fluid phases (e.g., gas or liquid, or mixtures thereof).

Some embodiments of the invention can include multilayer condensation and frost inhibiting coating surfaces with heterogeneous layer characteristics. These multilayer condensation and frost inhibiting coatings or assemblies can comprise non-interacting (i.e. static) or responsive (i.e. dynamic) interactions between the different 7D spatial regions and an external medium (which can include gas, liquid, or solid phases).

Some embodiments of the invention described herein can include condensation and frost inhibiting coatings, surfaces, layers, and assemblies that can offer superior performance in variety of applications including, but not being limited to, condensation, boiling, de-icing, anti-fouling (biological and chemical, e.g. salt or soot), and chemical resistance/defense.

Some embodiments of the invention generally comprise multifunctional condensation and frost inhibiting coatings, surfaces, layers, and assemblies that comprise 7D spatial heterogeneous wetting and adhesion properties. The various embodiments of condensation and frost inhibiting coatings, surfaces, layers, and assemblies as described herein can be applied to most any surface including, but not limited to, metal surfaces, polymer surfaces, glass surfaces, inorganic oxide surfaces, ceramic surfaces, composite material surfaces, materials of natural origin (such as wood or wood products), and surfaces including other coatings (e.g., paints or lacquers). Further, the multifunctional condensation and frost inhibiting coatings, surfaces, layers, and assemblies described herein can be applied to and/or can conform to any shape or structure, including planar surfaces, curved or bent surfaces, smooth surfaces, uneven or rough surfaces, or combinations thereof.

Example embodiments of multifunctional condensation and frost inhibiting coatings and/or assemblies with 7D spatial heterogeneities as described above can be seen in FIGS. 6A-6D, and 7A-7D. For example, FIG. 6A is a cross-sectional view of a condensation and frost inhibiting coating or film assembly 100 according to some embodiments of the invention. In some embodiments, a condensation and frost inhibiting coating or film assembly 100 can comprise a dual-layer nanoporous layer or condensation and frost inhibiting coating/superhydrophilic antifreeze infused structure. In some embodiments, the nanoporous layer can be hydrophobic or superhydrophobic. For example, in some embodiments, the condensation and frost inhibiting coating or film assembly 100 can comprise a first layer of at least one wick layer 300, and second layer of at least one porous layer (e.g., nanoporous layer 400). In some embodiments, the nanoporous layer 400 can be structured based on equation 8 described above. In some embodiments of the invention, the wick layer 300 can include at least a first side 315 and a second side 335, with an interior volume 325 between the first and second sides 315, 335. In some embodiments, the wick layer 300 can be formed from and/or comprise a hydrophilic or superhydrophilic material and/or can include an outer surface (either the first side 315 and a second side 335) that is hydrophilic or superhydrophilic. In some embodiments, the superhydrophilic wick layer 300 layer can comprise any conventional nylon filter modified with a polymeric nanoporous condensation and frost inhibiting coating (forming an nanoporous layer 400). In one non-limiting embodiment, the polymeric nanoporous condensation and frost inhibiting coating can be sprayed-on. In other embodiments, the polymeric nanoporous condensation and frost inhibiting coating can be applied using any conventional coating methods (e.g., such a dip-coating or water-fall coating). In some further embodiments, the wick layer 300 can comprise a superhydrophilic nylon polymer with vapor deposited nanoporous coating (forming the nanoporous layer 400).

A variety of materials can be used to form the superhydrophilic wick layer 300 and/or the nanoporous layer 400. For example, in some embodiments, in addition to, or in place of the aforementioned nylon material, the wick layer 300 can comprise any hydrophilic or superhydrophilic polymer, including, but not limited to nylon-based homopolymers, nylon-based copolymers, nylon-based polymer blends, Poly(N-isopropylacrylamide) and Polyacrylamide based polymers and copolymers, Poly (2-oxazoline) and Polyethylenimine based copolymers, acrylic-based polymers and copolymers including Poly(acrylic acid), Polymethacrylate, Poly(ethylene glycol) and Poly(ethylene oxide) based polymers and copolymers, Poly(vinyl alcohol) (PVA) based copolymers, and Poly(vinylpyrrolidone) based copolymers.

In some embodiments of the invention, the wick layer 300 can include porosity 340 comprising one or more voids 345. Further, in some embodiments, the voids 345 can form at least one reservoir 353 capable of holding or retaining fluid. In some embodiments, the voids 345 can comprise interconnected and/or isolated capillaries. In some embodiments of the invention, the wick layer 300 can be infused with at least one material capable of depressing the freezing point of water. In some embodiments, the wick layer 300 can be infused with at least one fluid capable of affecting the frost or freeze behavior of the wick layer 300 and/or the at least one nanoporous layer 400. For example, in some embodiments of the invention, the wick layer 300 can be infused with at least one fluid material comprising antifreeze properties, characteristics, or behavior (shown as antifreeze material 350). In some embodiments, the antifreeze material 350 can comprise any fluid capable of depressing the freezing point of water. Moreover, in some embodiments, the antifreeze material 350 can comprise any fluid capable of movement, flow, or migration within the wick layer 300 or out of the wick layer 300 (e.g., to a surface of the wick layer 300 and/to another coupled coating or layer).

In some embodiments, the antifreeze material 350 can comprise at least one alkylene glycol (such as ethylene glycol and/or propylene glycol) or derivatives thereof, glycerol, at least one glycol containing polymer, or mixtures thereof. In some embodiments, the antifreeze material 350 can comprise at least one antifreeze composition containing a water-soluble liquid alcohol. In some embodiments, the antifreeze material 350 can comprise one or more dicarboxylic acids, or salts thereof. In some other embodiments, the antifreeze material 350 can comprise an anti-freeze protein.

In some embodiments, the condensation and frost inhibiting coating or film assembly 100 can comprise at least one outer omniphobic shell, layer, or coating positioned adjacent, proximate, and/or coupled to the at least one wick layer 300. As shown in at least FIG. 6A, in some embodiments, the condensation and frost inhibiting coating or film assembly 100 can comprise at least one nanoporous layer 400 coupled to the at least one wick layer 300. In some embodiments, the nanoporous layer 400 can comprise at least a lower surface 425, an upper surface 475, and a volume 450 between the upper and lower surfaces 475, 425. In some embodiments, the nanoporous layer 400 can comprise a permeable outer omniphobic shell, layer, or coating that can form a superhydrophobic surface.

In some embodiments, the condensation and frost inhibiting coating or film assembly 100 can comprise a free standing layer, shell, or coating. In some further embodiments, the condensation and frost inhibiting coating or film assembly 100 can be applied (e.g., positioned adjacent, proximate, and/or coupled to) another surface or substrate. In some other embodiments, the condensation and frost inhibiting coating or film assembly 100 can be formed or assembled positioned adjacent or proximate a surface or substrate and/or formed onto a surface or substrate. For example, FIG. 6B is a cross-sectional view of a coated surface 200 according to some embodiments of the invention. As illustrated, in some embodiments of the invention, the coated surface 200 can comprise a substrate 250 including a condensation and frost inhibiting coating or film assembly 100 adjacent or coupled to an outer surface 260 of the substrate 250. In some embodiments of the invention, the condensation and frost inhibiting coating or film assembly 100 can be applied (e.g., positioned adjacent, or proximate, and/or coupled) to the outer surface 260 of the substrate 250. In some further embodiments, the condensation and frost inhibiting coating or film assembly 100 can be formed onto the outer surface 260 of the substrate 250. For example, in some embodiments, at least one wick layer 300 and/or at least one nanoporous layer 400 can be coupled to the outer surface 260 of the substrate 250. In some embodiments, a first side 315 of the wick layer 300 can be coupled to the outer surface 260. In some embodiments, the condensation and frost inhibiting coating or film assembly 100 can be applied to an article of manufacture. For example, in some embodiments, an article of manufacture or good (e.g., such as a commercial good) comprising the substrate 250 can be treated with the condensation and frost inhibiting coating or film assembly 100 so that at least a portion of the good comprises the coated surface 200.

In some embodiments, wick layer 300 coupled to the outer surface 260 of the substrate 250 can be infused with at least one material capable of depressing the freezing point of water formed or impacting the upper surface 475. In some embodiments, the wick layer 300 coupled to the outer surface 260 of the substrate 250 can be infused with at least one of the aforementioned antifreeze materials 350. Further, in some embodiments, at least one nanoporous layer 400 can be formed, applied and coupled to the wick layer 300 coupled to the outer surface 260 prior to the wick layer 300 being infused with at least one of the aforementioned the antifreeze materials 350.

In some embodiments of the invention, the substrate 250 of the various embodiments described herein can include metal substrates, polymer substrates, glass substrates, inorganic oxide substrates, ceramic substrates, composite material substrates, substrate materials of natural origin (including cellulosic substrates such as wood or wood products), and substrates including surfaces with coatings (e.g., paints or lacquers). In some embodiments, the substrate 250 can include planar substrates, curved or bent substrates, smooth substrates, uneven or rough substrates, or combinations thereof. Further, in some embodiments, the multifunctional coatings, surfaces, layers, and assemblies described herein can be applied to and/or can conform to any shape or structure of the substrate 250, including planar surfaces of the substrate 250, curved or bent surfaces of the substrate 250, smooth surfaces of the substrate 250, uneven or rough surfaces of the substrate 250, or combinations thereof.

In some embodiments, the nanoporous layer 400 coupled to the wick layer 300 can serve several functions. For example, in some embodiments, the nanoporous layer 400 can serve as a separator between the antifreeze material 350 and the environment. Consequently, in some embodiments, in the absence of frost or condensation, the nanoporous layer 400 can prevent ice accumulation by repelling impinging droplets. For example, FIG. 6C is a cross-sectional view of the condensation and frost inhibiting coating or film assembly 100 of FIG. 6A illustrating water repellent properties according to some embodiments of the invention, and FIG. 6D is a cross-sectional view of the coated surface 200 of FIG. 6B illustrating water repellent properties according to some embodiments of the invention. In some embodiments, incoming droplets 15 with some velocity can impact the upper surface 475 of the nanoporous layer 400 and be deflected as deflected droplets 20. The outer porous coating can also suppress condensation or formation of frost. These two processes almost always simultaneously with freezing rain and can dramatically increase adhesion of impinging drops. The nanoporous coating (nanoporous layer 400) can be viewed as an array of nano-scale or micro-scale pores partially filled with hygroscopic antifreeze material 350. These patterned "humidity sinks" (antifreeze materials 350 such as glycols are desiccants) decrease water vapor concentration between the surface pores, decreasing probability for nucleation of drops or frost.

In some embodiments, the wick layer 300 can include porosity 340 that comprises substantially continuous or discontinuous porosity. For example, in some embodiments, the wick layer 300 can comprise a continuous porosity (e.g., voids 345 that are continuous connected). In some other embodiments, the wick layer 300 can comprise a discontinuous porosity (e.g., voids 345 that are separated). In some further embodiments, the wick layer 300 can comprise a heterogeneous structure including both regions of continuous porosity, and regions of discontinuous porosity. In some further embodiments, the wick layer 300 can comprise porosity 340 including voids 345 that are nanometer-sized in diameter. In some other embodiments, the wick layer 300 can comprise porosity 340 including voids 345 are submicron in diameter. In some alternative embodiments, the wick layer 300 can comprise porosity 340 including voids 345 that comprise a diameter of about one micron. In some further embodiments, the wick layer 300 can comprise porosity 340 including voids 345 with a diameter greater than about a micron. In some embodiments of the invention, at least one reservoir 353 can comprise voids 345 with any one or combination of any or all of the above described diameters.

In some embodiments, at least a portion of the wick layer 300 can be modified to form an anti-icing surface. For example, in some embodiments, the structure, morphology, and/or chemistry of at least a portion of the wick layer 300 can be changed to render it superhydrophobic. For example, in the above mentioned example, a wick layer 300 comprising a superhydrophilic nylon polymer can include vapor deposited superhydrophobic coatings (forming the nanoporous layer 400). In some embodiments, the nanoporous coating can comprise a silicone or siloxane polymer. Some embodiments can include a nanoporous coating comprising at least one halosilane. Some embodiments can include halogenated polymers (e.g., fluorosilicone). Some further embodiments can comprise halo-silane based polymers. Some embodiments can include epoxy matrix materials with hydrophobic nanoparticle additives such as, but not limited to, fumed silica, Polytetrafluoroethylene, nanocarbons, and siloxanes.

In some embodiments, when atmospheric conditions result in condensation frosting or desublimation, the nanoporous layer 400 can become temporarily hydrophilic due to accumulation of frost and ice (see FIGS. 7A-7B). For example, FIG. 7A is a close-up cross-sectional view of a portion of a coating illustrating condensation (surface droplet 30) in accordance with some embodiments of the invention. The example embodiment includes an illustration of a coating that can be at least a portion of the condensation and frost inhibiting coating or film assembly 100 shown in FIGS. 6A and 6C and/or at least a portion of the coated surface 200 shown in FIGS. 6B and 6D. Further, FIG. 7B is a close-up cross-sectional view of a portion of a coating illustrating de-sublimation and condensation frosting 40 in accordance with some embodiments of the invention. In this example, it can be seen that the de-icing/condensation function of this coating can be achieved through preferential infusion of the bottom superhydrophilic layer (the wick layer 300) with antifreeze material 350. In some embodiments, infusion of the antifreeze material 350 into the wick layer 300 can cause the antifreeze material 350 to be positioned in one or more voids 345 forming at least one reservoir 353. Further, in some embodiments, wicked moisture 42 can pass into and through the nanoporous layer 400 in some embodiments. For example, in some embodiments, absorption of moisture (i.e., absorption of the surface droplet 30 shown in FIG. 7A forming the wicked moisture 42 shown in FIG. 7B) onto the nanoporous layer 400 can wet at least a portion of the underlying nanoporous layer 400, and resulting in at least a portion of the nanoporous layer 400 becoming less superhydrophobic, and more hydrophilic. In this instance, a stimulus adaptive wettability mechanism can lead to secretion of the antifreeze material 350 out of the nanoporous layer 400 in response to frost formation over at least a portion of the nanoporous layer 400. In some embodiments, if condensation leads to flooding of the superhydrophobic or omniphobic outer layer, antifreeze can also mix with the condensate via diffusion, depressing the freezing point of the solution. In other embodiments, high velocity drops can partially penetrate the coating 400, leading to release of antifreeze material 350 through diffusive mixing of the antifreeze material 350 and the drops.

In some embodiments of the invention, at least some portion of the antifreeze material 350 can travel back out of the wick layer 300 and into and/or through at least a portion of the nanoporous layer 400. In some embodiments, this can occur based on absorption of moisture on the surface of the coating (shown in FIG. 7B). For example, FIG. 7C is close-up cross-sectional view of a portion of a coating illustrating release of antifreeze material 350 subsequent to the de-sublimation and condensation frosting 40 illustrated in FIG. 7B in accordance with some embodiments of the invention. In some embodiments, at least some portion of the antifreeze material 350 can migrate through and out of the wick layer 300 and into and/or through at least a portion of the nanoporous layer 400. In some embodiments, the antifreeze material 350 can mix with wicked moisture 42 (e.g., to form a water-antifreeze region 45).

In some embodiments, antifreeze material 350 mixing with the frost layer (frost 40) can depress the freezing point of water, and cause melting and eventual removal of frost from the nanoporous layer 400 via droplet shedding and/or wicking into a superhydrophilic region of the wick layer 300. As used herein, "wicking" is defined as the drawing or moving of a fluid (e.g., moisture) onto or into a surface or material of a wick (e.g., such as wick layer 300). In some embodiments, the process of wicking can be due to capillary action, absorbency, or both. Further, in some embodiments, "wicking" can be defined as the flow of a fluid into a wick material by at least one or more of mass transport gravity, adhesion, Brownian motion, and capillary action. For example, FIG. 7D is close-up cross-sectional view of a portion of a coating illustrating water and antifreeze material 350 departure process subsequent to the antifreeze material 350 release illustrated in FIG. 7C in accordance with embodiments of the invention. As illustrated, in some embodiments, removal of the water-antifreeze mixture 50 from the water-antifreeze region 45 can occur through droplet shedding or wicking into a portion of the wick layer 300 (shown as water-antifreeze droplets 55). Further, in some embodiments, in case of extreme icing of the surface, the release of antifreeze material 350 can lead to formation of a thin lubricating water layer with a suppressed freezing point that can easily shed the frost 40. If fully iced over, the thin lubricating water-antifreeze layer can decrease ice adhesion to the surface, making it easy to remove. In practice, the frost-melt will either be removed through air motion (such as when used on an airplane wing) or be partially wicked into the wick layer 300. In some embodiments, a small volume of the antifreeze material 350 can be sacrificial. In some further embodiments, the antifreeze material 350 can be replenished over time. For example, in some embodiments, antifreeze material 350 can be intermittently or continuously supplied to a portion of the wick layer 300 using any conventional fluid delivery apparatus.

In another embodiment, any of the embodiments described herein can be used as an active cooling mechanism for human use. Specifically, in some embodiments, the nanoporous bi-layer condensation and frost inhibiting coating can be incorporated into a cooling gear for hazmat suits, space suits, sports cooling gear, outdoor workers, or medical uses. In some embodiments, hygroscopic liquid can be pumped through cooling tubes in much the same way as cooled water is currently. In some embodiments, if the tubing is made nanoporous on the side of the body (and hydrophobic to prevent leaking of the hygroscopic liquid), it can lead to creation of a humidity sink (depressed concentration) on the tube surface. Consequently, any sweat released from the body can evaporate and cool due to the mass concentration gradient that drives diffusion.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A coating or film assembly comprising:
   a first layer at least partially infused with at least one antifreeze material; and
   a second layer at least partially coupled to at least a portion of the first layer, wherein at least a portion of the second layer comprises pores with a defined spacing,
   wherein at least a portion of the second layer is configured and arranged to be rendered hydrophilic in the presence of absorbed moisture or phases of ice including at least one of frost, rime, or glaze, and
   wherein at least a portion of the first layer is configured and arranged to enable the antifreeze material to migrate through and out of the first layer into at least a portion of a hydrophilic region of the second layer and enabling a temperature of nucleation of the phases of ice on the second layer to be reduced by at least 40° C.

2. The coating or film assembly of claim 1, wherein the at least one antifreeze material includes a composition able to depress the freezing point of water.

3. The coating or film assembly of claim 1, coupled to a supply of the at least one antifreeze material.

4. The coating or film assembly of claim 1, wherein the antifreeze material includes at least one of an alkylene glycol, a glycol containing polymer, a water-soluble alcohol, a dicarboxylic acid, or salt thereof, and an anti-freeze protein.

5. The coating or film assembly of claim 1, wherein the first layer includes at least a first side and a second side, and an interior volume between the first and second sides.

6. The coating or film assembly of claim 5, wherein at least one of the first side and the second side comprises a hydrophilic or superhydrophilic material.

7. The coating or film assembly of claim 5, wherein at least the interior volume includes a porosity comprising voids.

8. The coating or film assembly of claim 7, wherein at least the interior volume is configured and arranged to form at least one reservoir capable of holding or retaining fluid.

9. The coating or film assembly of claim 5, wherein the interior volume includes interconnected and/or isolated capillaries.

10. The coating or film assembly of claim 1, wherein at least one of the first layer and the second layer comprises nanopores.

11. The coating or film assembly of claim 1, wherein the first layer comprises a hydrophilic or superhydrophilic polymer.

12. The coating or film assembly of claim 1, wherein the first layer and/or the second layer includes at least one of a nylon-based homopolymer, nylon-based copolymer, a nylon-based polymer blend, Poly(N-isopropylacrylamide), a Polyacrylamide based polymer, a Poly (2-oxazoline) and Polyethylenimine based copolymer, an acrylic-based polymer, a Poly(ethylene glycol) based polymer, a Poly(ethylene oxide) based polymer, a Poly(vinyl alcohol) (PVA) based polymer, and a Poly(vinylpyrrolidone) based polymer.

13. The coating or film assembly of claim 1, wherein the second layer comprises a permeable outer omniphobic shell, layer, or coating configured and arranged to form a superhydrophobic surface.

14. The coating or film of claim 13, wherein the coating includes at least one of silicone or siloxane polymer, halogenated polymers, halosilane based polymers, epoxy matrix materials with hydrophobic nanoparticle additives including at least one of fumed silica, Polytetrafluoroethylene particles, nanocarbon particles, and siloxanes.

15. The coating or film assembly of claim 1, wherein the first layer comprises a superhydrophilic nylon polymer with at least one superhydrophobic coating.

16. A coating method comprising:
    applying a first layer comprising porosity;
    applying a second layer to at least a portion of the first layer, the second layer comprising pores with a defined spacing, and being at least partially coupled to at least a portion of the first layer;
    coupling at least a portion of the first layer to a supply of at least one antifreeze material; and
    infusing at least at least a portion of the first layer with at least a portion of the at least one antifreeze material,
    wherein at least a portion of the second layer is rendered hydrophilic in the presence of absorbed moisture or phases of ice including at least one of frost, rime, or glaze, and
    wherein at least a portion of the first layer enables the antifreeze material to migrate through and out of the first layer into at least a portion of a hydrophilic region of the second layer, thereby enabling a temperature of nucleation of the phases of ice on the second layer to be reduced by at least 40° C.

17. The method of claim 16, wherein the at least one antifreeze material includes a composition able to depress the freezing point of water.

18. The method of claim 16, wherein the antifreeze material includes at least one of an alkylene glycol, a glycol containing polymer, a water-soluble alcohol, a dicarboxylic acid, or salt thereof, and an anti-freeze protein.

19. The method of claim 16, wherein at least one of the first layer and the second layer comprises nanopores.

20. The method of claim 16, wherein the first layer and/or the second layer includes at least one of a nylon-based homopolymer, nylon-based copolymer, a nylon-based polymer blend, Poly(N-isopropylacrylamide), a Polyacrylamide based polymer, a Poly (2-oxazoline) and Polyethylenimine based copolymer, an acrylic-based polymer, a Poly(ethylene glycol) based polymer, a Poly(ethylene oxide) based polymer, a Poly(vinyl alcohol) (PVA) based polymer, and a Poly(vinylpyrrolidone) based polymer.

* * * * *

UNITED STATES PATENT AND TRADEMARK OFFICE
CERTIFICATE OF CORRECTION

PATENT NO. : 10,501,640 B2  
APPLICATION NO. : 15/878158  
DATED : December 10, 2019  
INVENTOR(S) : Konrad Rykaczewski Page 1 of 1

It is certified that error appears in the above-identified patent and that said Letters Patent is hereby corrected as shown below:

In the Claims

Claim 14, Column 24, Line 30, after "film" insert -- assembly --.

Claim 16, Column 24, Line 47, delete "at least at least" and insert -- at least --, therefor.

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*